US012794923B2

(12) United States Patent
Mistry

(10) Patent No.: US 12,794,923 B2
(45) Date of Patent: Nov. 10, 2026

(54) PROCESSING AND/OR GENERATING CYBERSECURITY TELEMETRY DATA

(71) Applicant: Senseon Tech LTD, London (GB)

(72) Inventor: James Sebastian Emile Mistry, London (GB)

( * ) Notice: Subject to any disclaimer, the term of this patent is extended or adjusted under 35 U.S.C. 154(b) by 0 days.

(21) Appl. No.: 19/117,332

(22) PCT Filed: Sep. 28, 2023

(86) PCT No.: PCT/EP2023/076877
§ 371 (c)(1),
(2) Date: Mar. 31, 2025

(87) PCT Pub. No.: WO2024/068833
PCT Pub. Date: Apr. 4, 2024

(65) Prior Publication Data
US 2026/0205482 A1 Jul. 16, 2026

(30) Foreign Application Priority Data
Sep. 30, 2022 (GB) ..................................... 2214369

(51) Int. Cl.
*H04L 9/40* (2022.01)
*H04L 43/04* (2022.01)

(52) U.S. Cl.
CPC .......... *H04L 63/1425* (2013.01); *H04L 43/04* (2013.01); *H04L 63/1416* (2013.01)

(58) Field of Classification Search
CPC .. H04L 63/1425; H04L 43/04; H04L 63/1416
See application file for complete search history.

(56) References Cited

U.S. PATENT DOCUMENTS 10,146,822 B1 * 12/2018 Varteresian ......... G06F 16/2282
10,643,002 B1 * 5/2020 Veselov ................. G06F 21/00
(Continued)

FOREIGN PATENT DOCUMENTS

CN 105 099 821 B 5/2020
WO WO 2024/068833 A1 4/2024

OTHER PUBLICATIONS

International Search Report and Written Opinion for PCT Application No. PCT/EP2023/076877 dated Dec. 18, 2023 in 14 pages.

*Primary Examiner* — Darren B Schwartz
(74) *Attorney, Agent, or Firm* — Knobbe, Martens, Olson & Bear, LLP

(57) ABSTRACT

A cybersecurity system comprises a mapping component in the form of program code compiled from a telemetry serialization schema, and a cybersecurity application in the form of program code compiled independently of the mapping component and the telemetry serialization schema, the program code embodying a plurality of telemetry functions. Each telemetry function is specific to a different data type, the cybersecurity application configured to provide to the mapping component a message topic for a telemetry message comprising a data field having a data type that is not known to the cybersecurity application. The mapping component is configured to determine the data type of the data field based on the message topic, and cause the cybersecurity application to apply, to the data field, the telemetry function associated with the data type of the data field.

18 Claims, 18 Drawing Sheets

(56) References Cited

U.S. PATENT DOCUMENTS

| | | | | |
|---|---|---|---|---|
| 11,089,107 | B1 * | 8/2021 | Chor | H04L 63/08 |
| 2004/0031040 | A1 | 2/2004 | Chhed et al. | |
| 2012/0210426 | A1 * | 8/2012 | Yu | H04L 43/18<br>726/22 |
| 2013/0219453 | A1 * | 8/2013 | Balinsky | G06F 21/552<br>726/1 |
| 2014/0215561 | A1 * | 7/2014 | Roberson | H04L 63/02<br>726/3 |
| 2018/0212985 | A1 * | 7/2018 | Zadeh | H04L 63/1425 |
| 2021/0286874 | A1 * | 9/2021 | Jin | G06F 21/577 |
| 2022/0131951 | A1 | 4/2022 | Ovadia | |

* cited by examiner

PROCESSING AND/OR GENERATING CYBERSECURITY TELEMETRY DATA

TECHNICAL FIELD

The present disclosure pertains generally to the processing and/or generating of telemetry data in a cybersecurity system.

BACKGROUND

Cyber defense refers to technologies that are designed to protect computer systems from the threat of cyberattacks. In an active attack, an attacker attempts to alter or gain control of system resources. In a passive attack, an attacker only attempts to extract information from a system (generally whilst trying to evade detection). Private computer networks, such as those used for communication within businesses, are a common target for cyberattacks. An attacker who is able to breach (i.e. gain illegitimate access to) a private network may for example be able to gain access to sensitive data secured within it, and cause significant disruption if they are able to take control of resources as a consequence of the breach. A cyberattack can take various forms. A "syntactic" attack makes use of malicious software, such as viruses, worms and Trojan horses. A piece of malicious software, when executed by a device within the network, may be able to spread throughout the network, resulting in a potentially severe security breach. Other forms of "semantic" attack include, for example, denial-of-service (DOS) attacks which attempt to disrupt network services by targeting large volumes of data at a network; attacks via the unauthorized use of credentials (e.g. brute force or dictionary attacks); or backdoor attacks in which an attacker attempts to bypass network security systems altogether. With increasing emphasis on "remote" access, though remote desktop or virtual private network (VPN) connections and the like, further vulnerabilities and attack opportunities are created.

SUMMARY

An aim herein is to simplify the development and maintenance of a cybersecurity system that collects, processes and/or generates telemetry data that is structured into serialized messages according to a data model (a telemetry serialization schema or set of telemetry serialization schemas). The data model formally and precisely describes message structures used in the system. In particular, the data model defines a set of message fields for each message, and a data type of each message field. An architecture is presented that can more easily accommodate changes to the data model, and improve the robustness of the system by reducing the scope for human error. This is achieved using a mapping component that is automatically generated from the data model to programmatically encode the message structures in the data model, to support a telemetry-processing or telemetry-generating application that is 'schema agnostic' (that is, coded without knowledge of the message structures at compile time).

A particular issue addressed herein is applications that are written and compiled in typed programming languages. Such languages require data types to be assigned to variables at compile time, or the compiler will fail. This poses a particular challenge when designing a schema-agnostic application, as the message structures (and, in particular, the data types of each message field defined in the serialization schema(s)) are not known to the application at compile time.

According to a first aspect, a cybersecurity system comprises a mapping component in the form of program code compiled from a telemetry serialization schema, and a cybersecurity application in the form of program code compiled independently of the mapping component and the telemetry serialization schema, the program code embodying a plurality of telemetry functions. Each telemetry function is specific to a different data type, the cybersecurity application configured to provide to the mapping component a message topic for a telemetry message comprising a data field having a data type that is not known to the cybersecurity application. The mapping component is configured to determine the data type of the data field based on the message topic, and cause the cybersecurity application to apply, to the data field, the telemetry function associated with the data type of the data field.

In embodiments, the cybersecurity application may be configured to indicate the plurality of telemetry functions to the mapping component, and mapping component is configured to cause the cybersecurity application to apply the telemetry function to the data field via a call back to the telemetry function.

The plurality of telemetry processing functions may be stored as code portions in respective regions of processor memory, and may be indicated by the application providing respective references for identifying the respective regions of memory.

The mapping component may be configured to determine based on the message topic a field name of the data field and cause the application to apply the telemetry function to the field name.

The telemetry processing function may be configured to match the field name of the data field to a field name contained in a configuration input to the cybersecurity application.

The telemetry message may be received by the cybersecurity application in serialized form, and the telemetry function may be a telemetry processing function applied to a piece of telemetry data contained in the telemetry message.

The mapping component may be configured to extract a telemetry datum from the data field and cause the application to apply the telemetry processing function to the telemetry datum.

The telemetry processing function may be configured to match the field name of the data field to the field name contained in the configuration input, compare the telemetry datum to a pattern associated with the field name in the configuration input, and trigger a cybersecurity action responsive to a pattern match.

The telemetry function may be a telemetry generation function configured to return to the mapping component a piece of telemetry of its specific data type, and the mapping component may be configured to populate the data field with the piece of telemetry.

The cybersecurity system may comprise: a message queue; an analysis component; a telemetry database queryable by the analysis component; a deserialization component configured to receive messages from the message queue and convert each message to a database record in the telemetry database. The analysis component may be configured to perform a cybersecurity analysis on data records contained in the telemetry database. The cybersecurity application and the mapping component may operate directly on the message queue, without accessing the telemetry database.

A second aspect herein provides a method of processing cybersecurity telemetry data, the method comprising: providing to a mapping component, by a cybersecurity application, a message topic for a telemetry message comprising a data field having a data type that is not known to the cybersecurity application, wherein cybersecurity application has the form of program code compiled independently of the mapping component and the telemetry serialization schema, the program code embodying a plurality of telemetry functions, wherein each telemetry function is specific to a different data type, wherein the mapping component has the form of program code compiled from a telemetry serialization schema; and determining, by the mapping component, the data type of the data field based on the message topic, and causing the cybersecurity application to apply, to the data field, the telemetry function associated with the data type of the data field.

The method may comprise automatically generating the program code of the mapping component based on the telemetry serialization schema, independently of the cybersecurity application.

The telemetry message may be received by the cybersecurity application in serialized form, and the telemetry function may be a telemetry processing function applied to a piece of telemetry data contained in the telemetry message.

Alternatively, the telemetry function may be a telemetry generation function configured to return to the mapping component a piece of telemetry of its specific data type, and wherein the mapping component is configured to populate the data field with the piece of telemetry.

Another aspect provides non-transitory or transitory media embodying computer-readable instruction configured so as, upon execution by one or more computer processors, to cause the one or more computer processors to implement any method or platform functionality disclosed herein.

BRIEF DESCRIPTION OF FIGURES

For a better understanding of the present subject matter, and to show how embodiments of the same may be carried into effect, reference is made by way of example only to the following figures in which.

DETAILED DESCRIPTION

Figure 1:
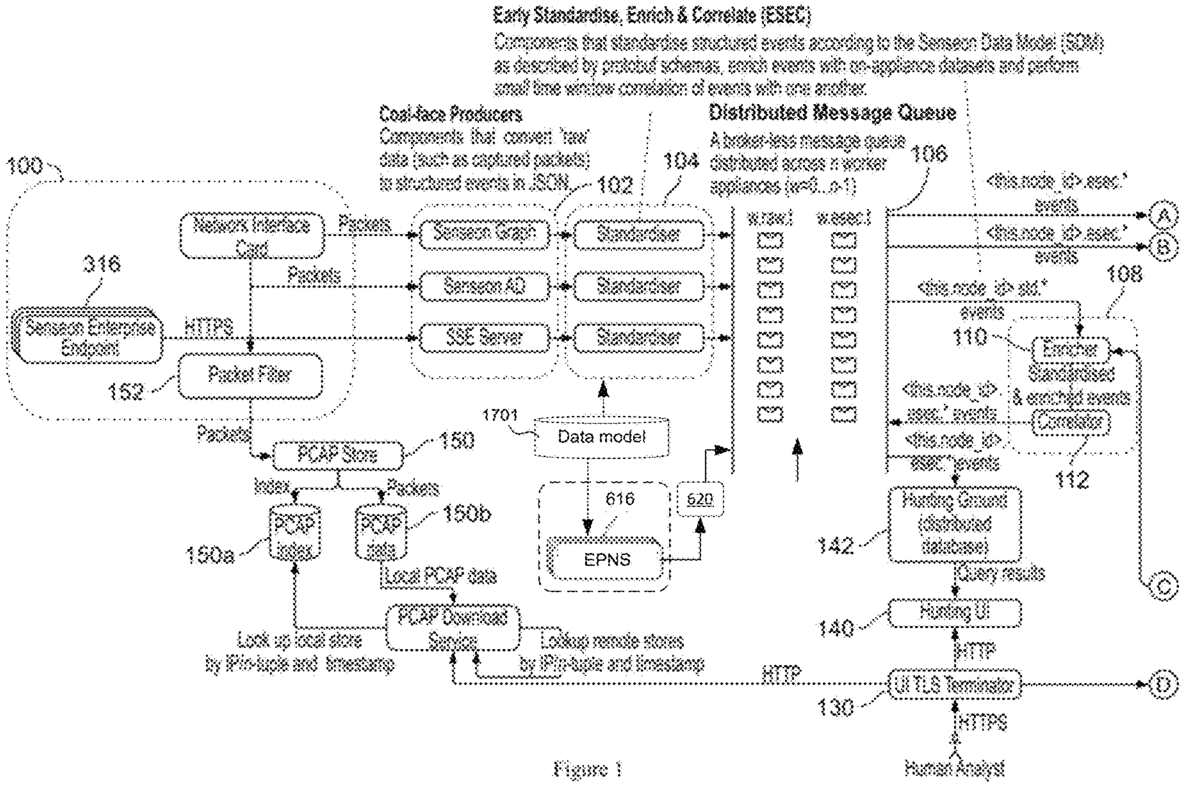
FIG. 1 shows, by way of context, a schematic function block diagram of a cyber defense platform.
Figure 1:
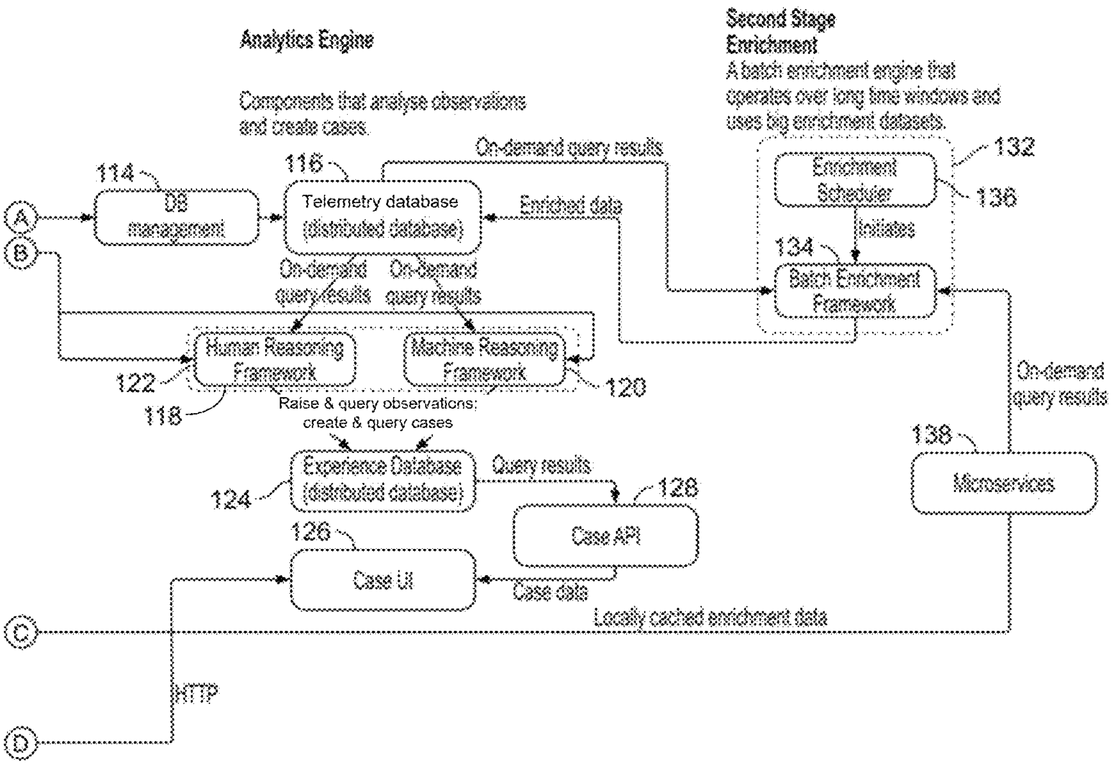

An important aspect of cybersecurity is the structuring of 'raw' cybersecurity telemetry to facilitate downstream detection/analysis. Such telemetry may, for example, include network traffic (or metadata), endpoint data collected by an endpoint agent, cloud telemetry, or detections that are themselves subject to further downstream analysis (such as 'third-party' detection passed as an input to another cybersecurity system for analysis in combination with other form(s) of telemetry). A data schema or set of data schemas may be used for this purpose.

A data schema is a precise and formal description of a data structure or set of data structures. For example, a database schema might formally describe structures such as database tables, fields and types, and the relationships between those components. As another example, a serialization schema may define a message format (or formats) used to transport data in serialized form. In a complex cybersecurity system, telemetry might be converted between multiple structured forms. As an example, network traffic or endpoint data may be collected by an endpoint agent or appliance sensor, serialized, and then sent to some central component. That component may then receive the telemetry, de-serialize it and store it in a relational database for subsequent processing.

In existing systems, different structured data formats are typically described by different types of data schema, essentially describing the same type of telemetry data in different ways for use in different contexts. This can lead to inconsistencies in the way telemetry is handled in different parts of the system, and that problem is exacerbated as the schemas are updated over time.

The described embodiments adopt a different approach, instead defining a single set of telemetry schemas (the data model) which serves as a 'single source of truth'. Rather than creating and maintaining multiple types of data schemas for different purposes, this single data model is used in multiple contexts. The following examples consider a data model defined in the Protocol Buffers (Protobuf) serialization format. However, the description is not limited in this respect, and extends to other data schema types.

Whilst the single source of truth approach is desirable in terms of both data consistency and the required effort to maintain and update the data model, it also creates its own challenges, as changes to the data model now need to be propagated to multiple components. Typically, this would require some modification to the code of multiple software components to reflect a change to the data model.

Existing tooling can be used to automate this process to a degree. For example, a Protobuf compiler has been developed, whereby a Protobuf schema may be automatically compiled into source code (such as C++, Java etc.). A Protobuf schema defines the format of a message type (or 'topic'). For each topic, the schema defines a number of fields and their associated data types (double, float, int32, int64, bool, string etc.), and assigns field numbers (integer field keys) and semantic field names (strings) to those fields. Each message field is a key-value pair, with the field number serving as the key, and the value having the specified data type. The standard Protobuf compiler compiles each message type into a corresponding message class (in the Object Oriented Programming sense) having a set of functions (methods) for writing data to the fields, a set of functions for reading data from the fields, and at least one serialization function (to convert an in-memory message object to serialized form). That code can, in turn, be incorporated into a variety of cybersecurity applications. In effect, the Protobuf message classes provide a programmatic interface to the underlying data model; an application that is generating or processing cybersecurity telemetry need only know how to interact with the relevant message class(es), which in turn simplifies the application code and reduces the burden on the application developer.

For example, in order to generate a serialized message, an application instantiates the corresponding message class, resulting in an in-memory message object (an instance of that message class). The application can then call the relevant functions of the object in order to populate the data fields of the message object, and finally call the object's serialization function to serialize the message object in a form that can be exported out of the processor memory (such as a string generated according to a well-defined syntax). Another component incorporating the Protobuf classes can then receive the serialized message, and de-serialize it by creating a new instance of the relevant message class, and populate the fields of the new message object with the corresponding data in the serialized message.

The Protobuf compiler includes a parser, and supports a plugin architecture, whereby additional code generation functionality can be implemented using the output of the Protobuf parser. This allows bespoke source code to be generated from a set of Protobuf schemas.

When a change is made to the data model, new source code can be generated automatically, and distributed to the relevant system components.

Whilst automatic code generation greatly simplifies the process of managing updates to the underlying data model, it has its limitations. Bespoke application code performing a telemetry generation or processing function would still require some level of awareness of the underlying data model in order to be able to interface with the automatically-generated code.

A particular problem arises when coding applications using typed programming languages (such as C, C++, Java etc.). Herein, 'typed' implies the programming language requires a type to be assigned to each variable at compile time (which is to say that variables cannot be dynamically assigned types at runtime). If the type of a variable is not defined in the application code, then the application code cannot be compiled into machine code. As such, if the existing Protobuf tooling were used in the present context, it requires a level of type-awareness in the application code regarding the data model. In particular, in order for an application to read to or write from a particular message field, the type of that data field would need to be known at compile time (that is, when the bespoke application code is compiled) to allow the application to interface with the corresponding Protobuf message class.

In the following, a software architecture is described that removes the requirement for schema type information to be known at application compile time when coding a schema-agnostic cybersecurity application in a typed programming language. This, in turn, provides greater flexibility, and reduces the burden on application developers, because message field types no longer need to be defined in the application code, and need not be known to the application until runtime. This novel architecture is based on a novel programmatic interface referred to as 'Typeless', which programmatically encodes message structures (and message serialization syntax) defined within a data schema, and incorporates a call back mechanism through which Typeless interfaces with a cybersecurity application. The call back mechanism is designed in a way that does not require type information from the data schema to be built into the application at compile time.

Figure 11:
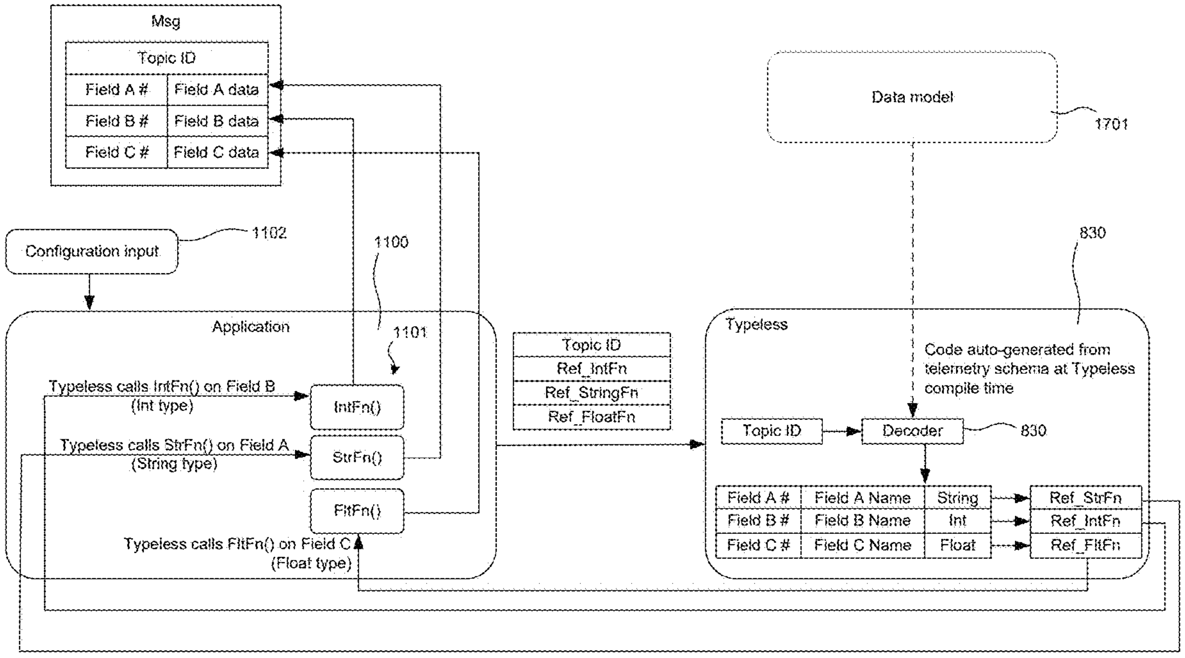
FIG. 11 shows a schematic block diagram of a typeless interface supporting a schema-agnostic application.

FIG. 11 shows a high-level function block diagram of a Typeless interface 830, also referred to herein as a mapping component. The Typeless interface 830 includes a decoder 830, which in turn encodes a set of field attributes (attributes of corresponding message fields) associated with a topic identifier (message type). The set of field attributes comprises a field number of each message field, a semantic field name, and a data type of the field. The relationship between the topic ID and the field attributes is defined in a data schema of a data model 1701. The decoder 830 is implemented in software, and the field attributes and their association with the topic ID are encoded programmatically in the machine code of the decoder 830. The machine code of the decoder 830 is, in turn, compiled from source code that is generated automatically from the data schema of the data model 1701. Note that the term 'compile' is used in two senses herein, firstly to refer to a process of automatically generating source code from a data schema, and secondly to refer to a process of translating (higher-level) source code into (lower-level) machine code. The meaning shall be clear from the context in which the term is used.

For simplicity, FIG. 11 shows only a single topic identifier and a single set of field attributes. In practice, the telemetry data schema 808 is likely to include multiple data schemas defining multiple topics (message types), and the message structure of each message topic is built into the Typeless interface 830 in the same manner for each message type. The Typeless interface 830 may also be implemented with a data model formed of multiple data schemas relating to different categories of telemetry (referred to as 'packages' below).

An application 1100 is shown, which is schema-agnostic, and interacts with the Typeless interface 830 in the following manner to perform some operation in respect of a message field or fields. One use case is message processing where the application 1100 needs to read and interpret telemetry from a data field of an existing message. Another use case is message generation, where the application 1100 needs to generate an instance of a message class and populate a data field of the message instance with telemetry of the correct data type.

The application 1100 passes a topic identifier as an input to the Typeless interface 830. The application 1100 is implemented as a set of program code that is compiled independently of the Typeless interface 830. The application 1100 has no knowledge of the message structure associated with the topic identifier, in the sense that no such knowledge is encoded in the program code of the application 1100. In other words, information about the message structure is not built into the application 1100 at compile time.

The application 1100 includes a set of callback functions 1101, which can be passed as arguments to the Typeless interface 830, along with the topic identifier. Each callback function 1101 is implemented as a portion of code contained within the application 1100. The callback functions 1101 are thus compiled as part of the application code.

In the present example, the only information about the data model 1701 that need to be known at the compile time of the application 1100 is the set range of data types used in the data model (e.g., double, float, int32, int64, bool, string etc.). This knowledge is needed, because the application 1100 includes a callback function for each datatype used in the data model 1701.

For example, if it is known that the data model 1701 uses only integer (int), floating point (float) and string types (implying that the value of any message field described by the data model 1701 has one of those three types), then the application 1100 would include three callback functions: a first (IntFn( )) that can be applied to integer-type message fields, a second (StrFn( )) that can be applied to string-type message fields and a third (FltFn( )) that can be applied to float-type message fields.

Each callback function is type-specific, and can only be applied to a message field whose data type matches that of the callback function. On receiving the topic identifier and callback functions, the decoder 830 reads the topic identifier and, for each associated message field, calls back the callback function whose data type corresponds to the data type of that message field.

By way of example, FIG. 11 considers a message type with three data fields: Field A having a string data type, Field B having an int data type and Field C having a float data type. On reading the topic identifier for this message type, the Typeless interface 830 thus calls IntFn( ) on Field B (int type), StrFn( ) on Field A (string type) and FltFn( ) on Field C (float type). The Typeless interface 830 is able to select the appropriate callback function for each message field because the data types of the message fields are built into the decoder 803 from the data model 1701 at Typeless compile time.

Each callback function is an application-specific telemetry function (that is, some application-specific operation or operations pertaining to cybersecurity telemetry). The Typeless interface 830 need only know the type and argument(s) of each callback function. Otherwise, from the perspective of the Typeless interface 830, each callback function is a 'black box'; Typeless simply calls the callback function of the correct type and provides it with any required input(s) (argument(s)). This provides a highly flexible architecture, whereby different application functions can be coded and deployed in a Type agnostic manner, without modification to the Typeless interface 830.

By way of example, a set of callback functions 1101 might be provided for processing different types of telemetry extracted from a message. As another example, a set of callback functions 1101 may be provided for the purpose of populating a telemetry message field(s) with telemetry of the correct type(s).

Note, the term "call back" is used in a broad sense to refer to any software architecture in which the typeless interface 830 is provided with a topic identifier, resolves that topic identifier to a set of field data type(s), and uses the data type of each message field to invoke the telemetry function of the correct data type on that message field. In practice, the application 1100 might pass a function reference (such as an in-memory pointer) to the typeless interface 830 that identifies a region of processor memory in which the portion of application code embodying a callback function is contained, or the application might pass an object reference (for example, the callback functions 1101 may be implemented as methods contained within a callback object or callback objects stored in processor memory, with the callback object(s) or reference(s) to the callback object(s) being passed to Typeless). The precise details of the call back mechanism are not germane. What is germane is that each callback function is contained in the code of the application 1100, and as such is compiled as part of the application 1100, independently from the Typeless interface 830, without knowledge of the message structures contained in the data model 1701 (other than the basic knowledge of the range of data types used in the data model 1701, to allow a callback function to be designed for each possible field type).

The Typeless interface 830 is compiled automatically from the data model 1701, programmatically encoding the message structure defined in the data model 1701, with a general-purpose call back interface that is agnostic to the specifics of the application 1100. This division between the application 1100 and the typeless interface 830 provides a highly flexible architecture, that can incorporate new or modified application without modification to the typeless interface 830, and equally can accommodate changes/updates to the data model 1701 without requiring application-level modification.

An application may be said to pass a callback function to another component, which includes the case of an application passing some reference (or references) to the code of the function in memory. References may be used when the application and typeless are executed on the same processor, or more generally when typeless and the application have access to a common memory resource (e.g. shared memory in a multi-processor architecture).

In some cases, the callback functions 1101 are executed based on a configuration input 1102 that is received by the application 1100 at runtime. The configuration input 1102 allows additional information to be provided to the application 1100 at runtime that is not contained in the code of the application 1100 at application compile-time.

One use-case of Typeless is to provide a 'fast-response' signature-based detection application (referred to below as 'LandingNet') that operates directly on serialized messages. In this example, the configuration input 1102 specifies at least one field name and at least one pattern (signature) associated with the field name. In this case, each callback function performs a type-specific pattern matching function. On receiving a message, LandingNet passes the message (or a reference to the message) to the Typeless 830, along with the topic identifier and the callback functions (alternatively, Typeless may extract the topic identifier from the message itself). Typeless then decodes the topic identifier, extracts the telemetry data from each field, and calls the type-appropriate callback function on the field name and field data of each message field.

Continuing the example of FIG. 11, in this case, IntFn( ) would implement an integer-type pattern matching algorithm (for comparing and matching integer variables), StrFn( ) would implement a string-type pattern matching algorithm (for comparing and matching string variables), and FltFn( ) would implement a float-type matching algorithm (for comparing and matching floating point variable). Typeless would process Field A of the message in the above manner, resulting in the following callback to LandingNet:

Typeless calls back StrFn(Field_A_name, Field_A_data)

This, in turn, causes the StrFn( ) function within LandingNet to firstly attempt to match "Field_A_Name" to a field name defined in the configuration input 1102. If a match is found, StrFn( ) would then determine if the matching field name is associated with any string-type pattern in the configuration input 1102 and, if so, attempt to match the string-type "Field_A_Data" to the string-type pattern(s) associated with the matching field name. If a pattern match is found, this would then trigger an appropriate response mechanism within LandingNet.

Similarly, for Field B:

Typeless calls back IntFn(Field_B_name, Field_B_data)

This, in turn, causes the IntFn( ) function within LandingNet to firstly attempt to match "Field_B_Name" to a field name defined in the configuration input 1102. If a match is found, IntFn( ) would then determine if the matching field name is associated with any integer-type pattern in the configuration input 1102 and, if so, attempt to match the integer-type "Field_B_Data" to the integer-type pattern(s) associated with the matching field name.

Similarly, for Field C:

Typeless calls back FltFn(Field_C_name, Field_C_data)

This, in turn, causes the FltFn( ) function within LandingNet to firstly attempt to match "Field_C_Name" to a field name defined in the configuration input 1102. If a match is found, FltFn( ) would then determine if the matching field name is associated with any float-type pattern in the configuration input 1102 and, if so, attempt to match the float-type "Field_C_Data" to the float-type pattern(s) associated with the matching field name.

Note that some other application could define a different set of callback functions that take the same arguments (field name and field data) but perform different operations on those arguments, without any modification to Typeless; Typeless will simply call back whatever callback function is provided for the data type in question.

Typeless deserializes the message in order to extract the telemetry data from each data field, but this is hidden from the application. It is beneficial for Typeless to extract the telemetry data (rather than the message), as this means the application does not require knowledge of the message serialization syntax (e.g. if messages are serialized as strings, the application would not need to know the string syntax used to delineate and number message fields). It is generally preferable for the details of serialization to be abstracted away from the application in this manner. Nevertheless, if the serialization syntax is known to the application, the application may extract one or more elements from the message and pass the extracted elements (e.g. the application might extract a field key, to request the field name associated with a specific field key).

Further details of the LandingNet use case are described below. Other use cases are also described.

First, details of an example cybersecurity platform in which Typeless may be deployed is described, to provide further context to the described embodiments.

A range of data may be used in a cybersecurity context as a basis for detecting cybersecurity threats (or potential threats) to any form of computerized infrastructure (such as a computer network, device, system, program or set of programs, database(s) etc.). Collected data indicative of such (potential) threats (alone or in combination with other data) may be referred to herein as "telemetry". An example cybersecurity platform is described herein that collects multiple modalities (forms) of telemetry from multiple sources and uses those various telemetry modalities as a basis for threat detection.

To facilitate reliable and efficient processing of telemetry collected from different sources, the telemetry is converted into a highly structured form prior to analysis (referred to as 'standardization' herein). A telemetry "data model" (1701, FIGS. 1, 7-8) is embodied as a set of predefined data schemas (telemetry schemas) that define the precise structure of different telemetry "event" or "record" types. The terms "event" and "record" are used interchangeably herein (unless otherwise indicated) to refer to a data structure having one or more data fields conforming to a predefined telemetry schema. Events may include all of the underlying 'raw' telemetry from which they are generated, but structured according to the data model 1701 (no information loss), or a more concise metadata summary of relevant aspects of the underlying raw telemetry ('lossy' conversion whereby information is selectively discarded, e.g. because it is of low analytical value). Improved reliability is achieved because downstream systems know the exact format of data they will receive. Efficiency gains can be achieved by reducing the 'verbosity' of individual telemetry messages (e.g. by not including field names in each event, but rather just identifiers which relate to the fields defined by a schema; this applies to both lossless and lossy telemetry restructuring).

The telemetry data model 1701 is structured as a set of "packages", where a package refers to a category of telemetry. For example, 'network' and 'endpoint' may be packages within the data model 1701. Each package comprises a set of data schemas ('topics') for structuring the corresponding category of telemetry (e.g. network data schemas, endpoint data schemas etc.). In other words, a topic defines a specific telemetry record type (e.g. 'endpoint.process', 'network.dns' etc.) and collections of related record types (e.g. 'endpoint', 'network' etc.) are referred to as packages.

Network telemetry refers to network data obtained through some form of network traffic monitoring within a network. Network telemetry can include 'raw' network data and/or information about the raw network data (metadata). To provide network traffic monitoring, specialized monitoring component(s), such as TAPs or mirrors, may be deployed at suitable location(s) within the network. Network traffic passes through such components transparently, and each component provides a copy or 'mirror' of the network traffic passing through it. Alternatively or in addition, network traffic monitoring may be implemented locally on endpoint devices within the network. For example, a cybersecurity platform is described below, in which an advanced form of endpoint network sensor (EPNS) is deployed to endpoint devices of the network to provide local monitoring and reporting of network traffic flowing to and/or from the endpoint device. Such endpoint network sensors may reduce reliance on other types of monitoring component (such as mirrors/TAPs) and/or complement functionality of other type(s) of monitoring component (e.g. in a deployment with "roaming" endpoints). In the described examples, an EPNS provides network telemetry in the form of structured metadata extracted locally at the endpoint (that is, the EPNS provides telemetry to the platform that it has already structured according to the data model 1701). Such sensors may, for example, be deployed in combination with centralized cybersecurity infrastructure to provide sophisticated threat detection, analytics, response and/or remediation functions. Raw network data may be collected from components (sub-systems, devices, software components etc.) across a monitored network, and re-structured into network events based on the data model 1701.

Endpoint telemetry refers to endpoint data (specific to some endpoint device within the network) that it would generally not be possible to obtain solely through network traffic monitoring. Endpoint telemetry is provided by some form of sensor executed on an endpoint device, which would typically interface with the endpoint's operating system (OS) to obtain endpoint-specific details. Endpoint monitoring software may be installed on endpoints of the network being monitored. The software monitors local activity at the endpoint on which it is installed, and feeds the resulting data (endpoint data) into the platform for analysis. The endpoint data may also be structured according to the data model 1701 locally at the endpoint, prior to submission to the platform. In the examples described below, the EPNS performs both local network traffic monitoring and additionally collects endpoint telemetry that is related to its collected network telemetry. Such endpoint data could, for example, include details of one or more processes running on an endpoint device and receiving and/or instigating network traffic; files (e.g. downloaded, uploaded or otherwise transferred to an endpoint device); users; other endpoint-type entities; or any combination thereof. Association of network and endpoint data may, for example, be performed locally at an endpoint by an EPNS (such that network and endpoint data are both structured and linked 'at source' by the EPNS before submitting the telemetry for analysis). When network traffic monitoring and restructuring is performed at the endpoint device itself, it may, in some cases, be more straightforward and reliable to perform this matching locally at the device. Alternatively or additionally, such linking of different telemetry types may be performed in a backend system, in the manner described below.

Other telemetry modalities are also considered. For example, "third-party" detection results may be collected as a form of telemetry (third-party telemetry). In this case, the results of third-party analysis (analysis performed outside of the platform) are consumed as inputs to the platform, and re-structured as needed based on the data model 1701 prior to downstream processing/further analysis within the platform itself. Such downstream processing may, for example, include further analysis of third-party telemetry in combination with other form(s) of telemetry to provide a more comprehensive form of threat detection. Third-party telemetry could, for example, include third-party network, endpoint, "Internet-of-things" (IoT) or cloud telemetry etc.

In general, telemetry can be generated by, collected from or otherwise related to any type of computing (hardware and/or software) infrastructure, including systems, networks, devices (physical and/or virtual), computer programs, databases etc. Such infrastructure can include infrastructure that is local to or managed by an organization and/or cloud-based infrastructure. With multiple, diverse telemetry sources, the benefits of telemetry standardization become even more apparent.

It can be useful to consider 'cloud' telemetry (collected from cloud-based infrastructure) as a category of telemetry in its own right, structured according to a cloud package within the data model 1701, as cloud-based infrastructure can present specific challenges in the context of cybersecurity.

A cybersecurity analysis is performed by a set of detection modules. Each detection module is a functional component (typically software) that can perform queries on a set of structured telemetry events and looks for particular threat patterns or characteristics within those events. For example, as described in more detail below, a given detection module might be programmed to search the events for indications of a tactic or technique known to be used by cyber attackers. As another example, a detection model might perform anomaly detection using unsupervised machine learning techniques.

The set of detection tasks implemented by the detection modules may be chosen to maximize the overall coverage and effectiveness of cybersecurity threat detection. In that case, decisions regarding the structure and deployment of detection modules are made primarily from an analysis perspective: each detection module is typically programmed to perform a reasonably discrete and self-contained detection task (e.g. looking for a particular tactic/technique of a cyberattack, or for anomalies in a particular subset of the event with respect to a particular set of features etc.) that is chosen in the context of a wider analysis. Whilst this approach has clear benefits in terms of the extent and quality of the analysis, it may not lead to the most efficient implementation in terms of developer time. The deployment of a new detection module has a significant cost in developer resources (typically requiring several days of developer time).

One source of inefficiency stems from similar operations that are performed across multiple detection modules. This can lead to code inefficiency, with similar operations being coded in multiple places (and possibly at different times) as the set of detection modules is developed, with greater potential for bugs and inconsistencies, as well as significant wasted developer time.

The present disclosure recognizes detection based on "signatures" as one such area of potential inefficiency. Signature-based detection uses some form of pattern recognition to detect patterns ('signatures') indicative of known threats.

The described embodiments provide a capability for developing signature-based detections (or 'rule-based' detections) with greater code efficiency and significantly reduced developer time. In many situations, it is desirable or necessary to use signatures and rules to detect malicious or suspicious activity. The described techniques allow signature-based detection to be implemented efficiently and robustly within the platform, by leveraging the highly-structured nature of the telemetry resulting from the upstream telemetry restructuring based on the data model 1701. Herein, unless otherwise indicated, a 'rule' is composed of one or more signatures, a relationship (e.g. one-to-one or one-to-many) between each signature and one or more fields of the data model 1701, and preferably an associated set of Boolean logic to define how and when an output is generated based on the (or each) signature and its related data field(s). In other words, a rule allows a signature or signatures to be associated in a particular way with a particular field or fields of the data model 1701. The upstream processing based on the data model 1701 ensures that all telemetry is available in a highly structured form, which in turn greatly simplifies the logic needed to define a rule.

In the described platform, structured telemetry records are stored in a telemetry database used as inputs to detections. Different levels of significance may be attached to a detection (e.g. based on severity and/or confidence of the detection). Significant detections are raised as "observations". Observations that are determined to be related to one another may, in turn, be clustered into "cases". Observations and cases are stored in a further database (the case database or observation database, where those terms are used interchangeably) separate from the telemetry database.

Certain detections may not be significant enough to warrant the creation of an observation. In that case, the output of a detection may be a further telemetry record, which could in turn be an input to some other detection (e.g. if it is more appropriate for another component of the platform to perform further work before raising an observation). A detection could also generate multiple outputs, e.g. a further telemetry record and an observation.

Certain forms of activity can be detected with high confidence using signatures/rules. In that case, signature/rule matching represents a high confidence detection on its own, without necessarily requiring further analysis. In the platform described below, this might result in the creation of an observation (which might, in turn, be included in a case if it can be related to other observation(s)).

Other forms of activity may be detectable using rules/signatures with a limited but significant degree of confidence. In that case, signature/rule matching may be used as a precursor to further higher confidence analysis, in which case a signature-based detection might result in the generation of further telemetry for use by the detection modules (alternatively, in certain contexts, the limited degree of confidence may be justified, in which case the signature/rule may be used to perform the entire detection, possibly resulting in the creation of an observation).

While detections primarily or exclusively relying on signatures/rules are often less costly to implement than detections performing other analysis, there is still scope for inefficiency in the implementation. 'Hard-coding' a single signature-based detection of the simplest kind involves approximately several days of developer and detection engineer effort, with additional ongoing maintenance effort.

The applicant's investigations indicate that, in practice, a significant proportion of detections rely exclusively on signatures, or a combination of signatures and baselining. Accordingly, significant practical benefits stem from improved signature-based detection efficiency.

In the described embodiments, a configurable signature-based detection appliance application, referred to as "LandingNet", runs on an appliance (or on each node of a clustered appliance). During initialization, LandingNet loads a ruleset, which is a configurable set of one or more rules in the above sense (that is, a pattern or set of patterns, a relationship between each pattern and one or more data fields of the data model 1701 used to structure the telemetry, and preferably a set of boolean logic that defines how and when an output is generated based on the pattern(s) and their related data field(s)). The ruleset provides a signature detection configuration, and serves as a 'configuration input' to LandingNet, in that the ruleset can be modified to reconfigure the operation of LandingNet (e.g. to modify or remove existing rules, or to add new rules) without any modification to the LandingNet application itself. For example, LandingNet may be implemented as a computer program or set of computer programs, which can be reconfigured by modifying the ruleset without modifying any code of the computer program(s).

Upon loading the ruleset, the rules contained in the ruleset are compiled into a data structure so that they can be applied in a performant manner. Based on the signature detection configuration, LandingNet determines which patterns to apply to different telemetry records and fields as they are received. If patterns are found, and these findings collectively satisfy the defined boolean criteria to produce a detection result, an output(s), such as observation and/or a further telemetry record, may be produced to record the positive detection. The manner in which such detections are recorded is defined by the signature detection configuration.

In the described implementation, the LandingNet application operates based on a "configuration file". The ruleset may be contained in the configuration file or it may be contained in a separate file or collection of files that is referenced in the configuration file. The configuration file may also contain other application configuration not related to the rules (e.g. number of threads to start, hostname/port to send output to etc.). t. In any event, the ruleset is a configuration that is written in a well-defined format (referred to as a 'rule schema' or 'LandingNet' schema) that allows rules to be defined and modified easily by non-developers. In the examples described below, the rule schema is written in YAML-like language (YAML defines a general structure for the LandingNet schema, but LandingNet further imposes a strict format on the YAML structure to ensure precise rule definitions with reference to the data model 1701) or other human-readable rule syntax.

As is evident from the above description, the rule schema is closely related to the set of telemetry schemas (the data model 1701) used to generate structured telemetry. The telemetry events have a precise, well-defined structure, and the use of structured telemetry greatly simplifies the implementation of LandingNet: a pattern recognition rule can be defined in the configuration file in just a few lines that indicate the pattern (or patterns) to be recognized and a reference to the field (or fields) within one (or more) of the telemetry schema(s) to which the rule shall be applied. The ability to easily configure LandingNet stems in part from the data model 1701 as, in essence, a new rule can be defined simply by associating a pattern (or patterns) of interest with a relevant data field (or fields) of the data model 1701. This has the dual benefit of being both simple to use and highly flexible. If the telemetry were not structured in this way, it would be challenging to achieve the same levels of both simplicity and flexibility, and it is likely that either flexibility or simplicity would suffer as a result.

The most basic form of rule associates a single pattern with a single data field of the data model 1701, such that an output is generated when that pattern is determined to match the corresponding data field of a structured telemetry event. More sophisticated rules are defined in terms of boolean logic applied to multiple patterns and/or multiple data fields. ruleset can also be used to configure other aspects of a rule, such as matching criteria (e.g., a type of pattern recognition to be used) and a type of output to be generated when the rule is satisfied (when the rule 'fires'), e.g. an observation and/or further telemetry record, as noted above.

FIG. 1 shows an example of an integrated cybersecurity platform. The integrated cyber defense platform protects a network against cyberattacks through a combination of comprehensive telemetry collection and organization, and advanced analytics applied to the resulting output within a reasoning framework.

The cybersecurity platform may serve multiple organizations, each with their own network/infrastructure deployment.

As described later, and shown in FIG. 8, a LandingNet application is deployed within the platform, with benefits that include:

- Reduced implementation cost: signature implementation can occur without developer involvement; detection engineers and analysts are able to directly implement and update signatures using a well-defined rule format;
- Improved matching performance: telemetry is processed in stream and can be scaled horizontally. No micro-batching is required. This approach is compatible with clustered platform designs.
- Improved signature maintenance: signature maintenance can occur without developer involvement. Detection engineers and analysts are able to directly implement and update signatures using a well-defined rule format.
- Reduced time to deployment: signature implementation deployment can occur without developer involvement. LandingNet's "self-service" capability allows detection engineers and analysts to directly deploy signatures to organizations. As well as freeing developer resources for other tasks, paired with tooling support (e.g. continuous deployment pipelines) this can significantly reduce signature deployment time.

Organization signatures: by exposing LandingNet's configurability to the organizations themselves, organizations can use their own threat intelligence within the platform. This would involve a user-facing version of LandingNet's configuration capability, allowing organizations direct or indirect control over LandingNet ruleset(s).

In addition to the efficiency/flexibility benefits, LandingNet has benefits on the analysis side as well. In particular, with LandingNet, it is easy to create rules that bridge different topics within a package and even different categories of telemetry (e.g. different packages within the data model 1701). A single pattern recognition rule can be straightforwardly defined and applied across any subset of data fields within the data model 1701, including data fields of different topics within the data model 1701. These could be different topics within a given package (e.g. network or endpoint) but also topics within different packages. Thus, rules can easily be defined across multiple forms of telemetry and/or multiple telemetry source types. The ability to define a signature-based detection across multiple packages in particular stands in contrast to a more traditional approach in cybersecurity where different categories of telemetry tend to be 'siloed' and analyzed more-or-less independently. For example, in a traditional setup, endpoint signature-based detection may be performed using YARA rules, with separate network signature-detection using Snort signatures, and cloud signature-based using CloudWatch event rules separate from both the network and endpoint detections.

The described platform operates according to a "triangulation" model in which multiple forms of analysis may be used as a basis for threat detection. To provide effective triangulation, techniques such as anomaly detection, such as rules-based detections and/or detections based on supervised and/or unsupervised machine learning or other statistical methods more generally may be applied in any combination. By way of example, a particular form of threat detection is formulated around the "Mitre ATT&CK framework" (or any other structured source of attack knowledge) is described below. Whilst Mitre is considered, the description applies more generally to other forms of tactics/techniques, including tactic/techniques defined in alternative (e.g. bespoke) threat models, or learned though statistical analysis (such as supervised or unsupervised machine learning).

FIG. 1 shows a schematic block diagram of the cyber defense platform, which is a system that operates to collect and analyze various types of telemetry. The cyber defense platform is implemented as a set of computer programs that perform the data processing stages disclosed herein. The computer programs are executed on one or more processors of a data processing system, such as CPUs, GPUs etc.

In a data optimization stage, telemetry is captured in the form of structured, timestamped events. Both network events and endpoint events (and/or other telemetry events, such as third-part, cloud etc.) are collected at this stage and enhanced for subsequent analysis. Events generated across different data collectors are standardized, as needed, according to the predefined telemetry data model 1701.

The system is shown to comprise a plurality of data collectors 102 which are also referred to herein as "coal-face producers". The role of these components 102 is to collect telemetry and, where necessary, process that data into a form suitable for downstream cyber security analysis. This may include the collection of raw network data from components of the network being monitored and conversion of that raw data into structured events (network events), as described above. The raw network data is collected based on network tapping, for example (which may be used in cases where endpoint network monitoring and reporting is not viable or is undesired).

Event standardization components 104 are also shown, each of which receives raw telemetry data outputted from a respective one of the coal-face producers 102. The standardization components 104 standardize these structured events according to the predefined telemetry data model 1701, to create standardized telemetry events.

The raw network data that is collected by the coal-face producers 102 is collected from a variety of different network components 100. The raw network data can for example include captured data packets as transmitted and received between components of the network, as well as externally incoming and outgoing packets arriving at and leaving the network respectively.

Additionally, structured endpoint events are collected using endpoint agents 316 executed on endpoints throughout the network. The endpoint agents provide structured endpoint events to the coal-face producers 102 and those events are subject to standardization, enrichment and correlation as above. Whilst it is generally preferred to implement network traffic monitoring and reporting locally at endpoint where possible, and to link the resulting network data with endpoint data locally at the endpoint, there are circumstances where this may not be possible or desired, in which case endpoint data may be received that is not (yet) linked to network data.

Once standardized, telemetry events (messages) are stored in a message queue 106 (event queue). For a large-scale system, the message queue can for example be a distributed message queue. That is, a message queue 106 embodied as a distributed data storage system comprising a cluster of data storage nodes (not shown in FIG. 1).

As part of the data optimization, first stage enrichment and joining is performed. This can, to some extent at least, be performed in real-time or near-real time (processing time of around 1 second or less). That is, network and endpoint events are also enriched with additional relevant data where appropriate (enrichment data) and selectively joined (or otherwise linked together) based on short-term temporal correlations. Augmentation and joining are examples of what is referred to herein as event enhancement.

An event optimization system 108 is shown having an input for receiving telemetry events from the message queue 106, which it processes in real-time or near real-time to provide enhanced events in the manner described below. In FIG. 1, enhanced events are denoted w.esec.t, as distinct from non-enhance events denoted w.raw.t. Non-enhanced events that are stored in the message queue 106 are shown down the left-hand side of the message queue (these are the standardized, structured events provided by the standardization components 104 and/or by endpoint agents) whereas enhanced events are shown on the right-hand side. However, it will be appreciated that this is purely schematic and that the events can be stored and managed within the message queue 106 in any suitable manner.

The event enhancement system 108 is shown to comprise an enrichment component 110 and a joining component 112. The enrichment component 106 operates to augment events from the message queue 106 with enrichment data, in a first stage enrichment. The enrichment data is data that is relevant to the event and has potential significance in a cybersecurity context. It could for example flag a file name or IP address contained in the event that is known to be malicious from a security dataset. The enrichment data can be obtained from a variety of enrichment data sources including earlier events and external information. The enrichment data used to enrich an event is stored within the event, which in turn is subsequently returned to the message queue 106 as described below. In this first-stage enrichment, the enrichment data that is obtained is limited to data that it is practical to obtain in (near) real-time. Additional batch enrichment is performed later, without this limitation, as described below.

The joining component 112 operates to identify short-term, i.e. small time window, correlations between events. This makes use of the timestamps in the events and also other data such as information about entities (devices, processes, users etc.) to which the events relate. The joining component 112 joins together events that it identifies as correlated with each other (i.e. interrelated) on the timescale considered and the resulting joined user events are returned to the message queue 106. This can include joining together one or more network events with one or more endpoint events where appropriate (applicable to network and endpoint data that has not been linked prior to reporting).

In FIG. 1, the joining component 112 is shown having an output to receive enriched events from the enrichment component 110 such that it operates to join events, as appropriate, after enrichment. This means that the joining component 112 is able to use any relevant enrichment data in the enriched events for the purposes of identifying short-term correlations. However, it will be appreciated that in some contexts at least it may be possible to perform enrichment and correlation in any order or in parallel.

A telemetry database manager 114 is shown having an input connected to receive events from the message queue 106. The telemetry database manager 114 retrieves telemetry events, and in particular enhanced (i.e. enriched and, where appropriate, joined) events from the message queue 106 and stores them in a telemetry database 116. The telemetry database 116 may be a distributed database. The telemetry database 116 stores events on a longer time scale than events are stored in the message queue 106.

A batch enrichment engine 132 performs additional (second stage) enrichment of the events in the telemetry database 116 over relatively long time windows and using large enrichment data sets. A batch enrichment framework 134 performs a batch enrichment process, in which events in the telemetry database 116 are further enriched. The timing of the batch enrichment process is driven by an enrichment scheduler 136 which determines a schedule for the batch enrichment process. Note that this batch enrichment is a second stage enrichment, separate from the first stage enrichment that is performed before events are stored in the telemetry database 116.

Figure 3:
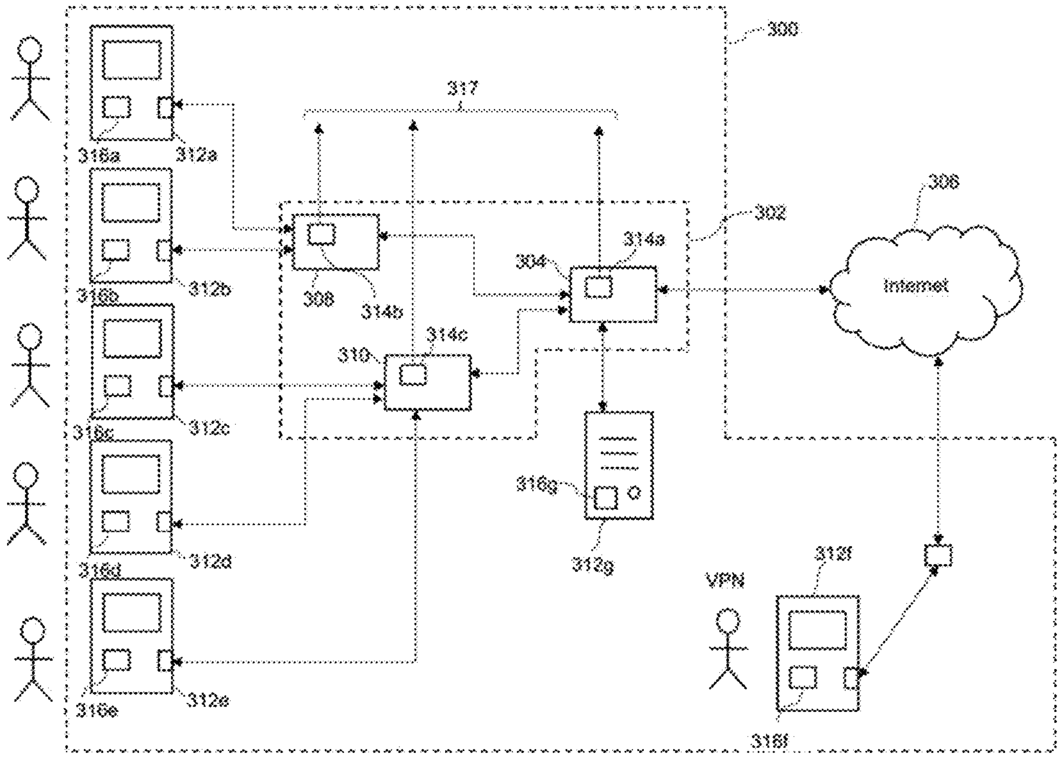
FIG. 3 shows a schematic block diagram of a network which may be subject to a cyber-security analysis.

Network and Endpoint Events:

FIG. 3 shows a schematic block diagram of an example network 300 which is subject to monitoring, and which is a private network. The private network 300 is shown to comprise network infrastructure, which can be formed of various network infrastructure components such as routers, switches, hubs etc. In this example, a router 304 is shown via which a connection to a public network 306 is provided such as the Internet, e.g. via a modem (not shown). This provides an entry and exit point into and out of the private network 300, via which network traffic can flow into the private network 300 from the public network 306 and vice versa. Two additional network infrastructure components 308, 310 are shown in this example, which are internal in that they only have connections to the public network 306 via the router 304. However, as will be appreciated, this is purely an example, and, in general, network infrastructure can be formed of any number of components having any suitable topology.

In addition, a plurality of endpoint devices 312*a*-312*f* are shown, which are endpoints of the private network 300. Five of these endpoints 312*a*-312*e* are local endpoints shown directly connected to the network infrastructure 302, whereas endpoint 312*f* is a remote endpoint that connects remotely to the network infrastructure 302 via the public network 306, using a VPN (virtual private network) connection or the like. It is noted in this respect that the term endpoint in relation to a private network includes both local endpoints and remote endpoints that are permitted access to the private network substantially as if they were a local endpoint. The endpoints 312*a*-312*f* are user devices operated by users (client endpoints), but in addition one or more server endpoints can also be provided. By way of example, a server 312*g* is shown connected to the network infrastructure 302, which can provide any desired service or services within private network 300. Although only one server is shown, any number of server endpoints can be provided in any desired configuration.

For the purposes of collecting raw network data, a plurality of network data capture components 314*a*-314*c* are provided. These can for example be network taps. A TAP is a component which provides access to traffic flowing through the network 300 transparently, i.e. without disrupting the flow of network traffic. TAPs are non-obtrusive and generally non-detectable. A TAP can be provided in the form of a dedicated hardware TAP, for example, which is coupled to one or more network infrastructure components to provide access to the raw network data flowing through it. In this example, the taps 314*a*, 314*b* and 314*c* are shown coupled to the network infrastructure component 304, 308 and 310 respectively, such that they are able to provide, in combination, copies 317 of any of the raw network data flowing through the network infrastructure 302 for the purposes of monitoring. It is this raw network data that is processed into structured network events for the purpose of analysis.

Figure 2:
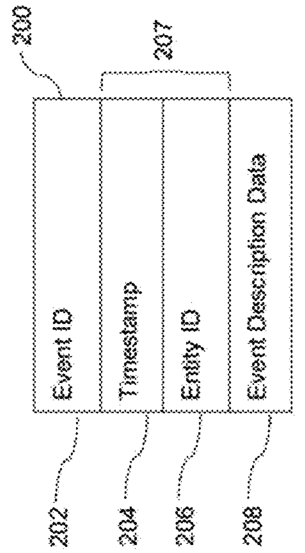
FIG. 2 shows a highly schematic representation of a network event.

FIG. 2 shows a schematic illustration of an example network event 200.

The network event 200 is shown to comprise a timestamp 204, an entity ID 206 and network event description data (network event details) 208. The timestamp 204 and entity ID 206 constitute metadata 207 for the network event details 208.

The network event description data 208 provides a network event description. That is, details of the activity recorded by the network event that has occurred within the network being monitored. This activity could for example be the movement of a network packet or sequence of network packets through infrastructure of the network, at a particular location or at multiple locations within the network.

The network event data 208 can for example comprise one or more network event type indicators identifying the type of activity that has occurred. The entity ID 206 is an identifier of an entity involved in the activity, such as a device, user, process etc. Where multiple entities are involved, the network event can comprise multiple network event IDs. Two important forms of entity ID are device ID (e.g. MAC address) and network address (e.g. IP address, transport address (IP address plus port) etc.), both of which may be included in a network event.

As well as being used as part of the analysis (in conjunction with the timestamps 204), entity IDs 206 and network event description data 208 can be used as a basis for querying enrichment data sources for enrichment data.

The timestamp 204 denotes a timing of the activity by the network event 200. Such timestamps are used as a basis for associating different but related network events, together with other information in the network event 200 such as the entity ID 206 or IDs it contains.

The network event 200 can have structured fields in which this information is contained, such as a timestamp field, one or more entity ID fields and one or more network event description fields. The field-based format of the network event 200 is defined by the telemetry data model 1701.

The network event 200 is shown to comprise a network event identifier (ID) 202 which uniquely identifies the network event 200.

Returning to FIG. 3, for the purpose of collecting endpoint data, endpoint monitoring software (code) is provided which is executed on the endpoints of the network 300 to monitor local activity at those endpoints. This is shown in the form of endpoint agents 316*a*-316*g* (corresponding to endpoint agents 316 in FIG. 1) that are executed on the endpoints 312*a*-312*g* respectively. This is representative of the fact that endpoint monitoring software can be executed on any type of endpoint, including local, remote and/or server endpoints as appropriate. This monitoring by the endpoint agents is the underlying mechanism by which endpoint events are collected within the network 300. Enhanced endpoint agents that additionally implement local network traffic monitoring and reporting (generating pre-joined endpoint and network events 'at source') are described later.

Figure 4:
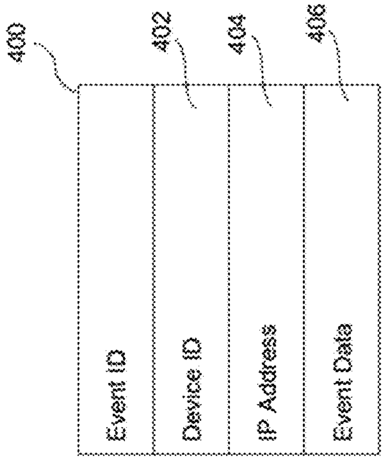
FIG. 4 shows a highly schematic representation of an endpoint event.

FIG. 4 shows a schematic illustration of a certain high level structure of an endpoint event 400.

The endpoint event 400 is shown to comprise at least one endpoint identifier, such as a device identifier (e.g. MAC address) 402 and network (e.g. IP) address 404 of the endpoint to which it relates, and endpoint event description data 406 that provides details of the local activity at the endpoint in question that triggered the creation of the endpoint event 400. Those data are stored in fields, as defined in the telemetry data model 1701.

One example of endpoint activity that may be valuable from a cyber defense perspective is the opening of a connection at an endpoint. For example, a TCP/IP connection is uniquely defined by a five-tuple of parameters: source IP address (IP address of the endpoint being monitored), source port, destination IP address (IP address of an e.g. external endpoint to which the connection is being opened), destination port, and protocol. A useful endpoint event may be generated and provided to the platform for analysis when an endpoint opens a connection, in which the five-tuple defining the connection is recorded, and well as, for example, an indication of a process (application, task, etc.) executed on the endpoint that opened the connection.

As noted, one of the key features of the present cyber defense platform is its ability to link together interrelated network and endpoint events. Following the above example, by linking an endpoint event recording the opening of a connection and details of the process that opened it to network events recording the flow of traffic along that connection, it becomes possible to link specific flows of network traffic to that specific process on that endpoint.

Additional examples of endpoint information that can be captured in endpoint events include information about processes running on the endpoint (a process is, broadly, a running program), the content of files on the endpoint, user accounts on the endpoint and applications installed on the endpoint. Again, such information can be linked with any corresponding activity in the network itself, to provide a rich source of information for analysis.

Such linking can occur within the platform both as part of the real-time joining performed by the joining component 112.

However, network and endpoint events can also be linked together as part of the analysis performed by the analysis engine that is inherently able to consider links between events over longer timescales, as will now be described.

Detections:

Returning to FIG. 1, in an analytics/detection stage, the collected telemetry events are subject to sophisticated real-time analytics/detections, by an analysis engine 118 (detection engine). This may include the use of statistical analysis techniques commonly known as "machine learning" (ML) and/or as rules-based detection.

The analysis engine 118 is shown having inputs connected to the event queue 106 and the telemetry database 116 for receiving events for analysis. The events received at the analysis engine 118 from the event queue 106 directly are used, in conjunction with the events stored in the telemetry database 116, as a basis for detections within the analysis engine 118. Queued events as received from the message queue 106 permit real-time analysis, whilst the telemetry database 116 provides a record of historical events to allow threats to be assessed over longer time scales as they develop.

As noted, significant detections give rise to "observations", which may, in turn, be compiled (clustered/combined) into "cases". Detections may, for example, be based on recognized tactics, techniques and/or other threat/attack patterns or anomalies (such as unsupervised anomaly detection). A pipeline is provided to selectively and intelligently alert an analyst to observations or cases that are deemed to be of sufficient significance.

Observations and cases are stored in a separate 'experience' database 124 (which may also be a distributed database). Observations and cases are stored in the same database 124 as each other in the following examples (but separate from the telemetry database 116), and in that context, the terms 'case database' and 'observation database' are used interchangeably with 'experience database'. In other implementations cases and observations may be stored in separate case and observation databases.

Observations may be generated based on events that are received at the analysis engine from the message queue 106, in real-time or near-real time.

Observations may also be generated based on events that are stored in the telemetry database 116. For example, it may be that an event is only identified as potentially threat-related (triggering a detection) when that event has been enriched in the second stage enrichment.

An observation is generally generated based on a single event (whether received from the telemetry database 116 or the message queue 106 directly). The single event could be a joint event (meaning that certain short-term correlations may already have been taken into account at the point an observation is generated). Each observation has at least one assigned threat score indicating the significance of the observation. For example, the threat score may denote one or both of confidence and severity (e.g. a high score may indicate a high confidence that an attack of material severity is occurring or has occurred). A threat score may, in that case, increase if the confidence increases, or the severity increases or both. In other implementations, separate confidence and severity scores may be computed and used within the system. Threat scores may be numerical or categorical (e.g. 'high', 'medium', 'low'). Observations and/or cases may be selectively escalated to an analyst based on their threat scores, to provide targeted alerts and/or reporting (reducing false positives, overreporting etc.).

Longer-term correlations are accounted for by grouping observations into cases when those observations appear to be related. The grouping of observations into cases considers longer-term temporal correlations between the underlying events. Once created, cases may be developed by matching subsequent observations to existing cases in the case database 124. A case may be assigned a threat score based on its constituent observations. Observations/cases may, for example, be populated with network data, endpoint data or a combination of endpoint and network data (or more generally different forms of telemetry data) obtained from multiple telemetry sources. The following description refers to network and endpoint events, but applies more generally to other forms of structured telemetry received and processed within the system, such as third-party telemetry, cloud telemetry etc.

A case may, for example, be created for at least one defined threat hypothesis, by clustering together observations of different tactics/techniques associated with the threat hypothesis. More generally, an observation may be generated in response to an event that is classed as potentially malicious and observations may be grouped into cases when it is determined that they might relate to a common threat. Once a case has been created, it may be populated with further observation(s) that are identified as related to the case in question in order to provide a timeline of observations/events that underpin the case.

New observations can be matched to existing observations or cases using defined event association criteria, as applied to the content of the events—in particular the timestamps, but also other information such as entity identifiers (device identifier, IP address etc.). Three key pieces of metadata that are used as a basis for linking observations in this way are:

- timestamps,
- endpoint devices, and/or specific endpoint information such as:
  - endpoint host name
  - endpoint open sockets
- IP address.

There can be multiple pieces of metadata of each type, for example source and destination IP addresses. Such metadata of cases is derived from the event or events on which the case is based. Note the above list is not exhaustive, and the types of data can be used as a basis for observation linking.

For example, events may be associated with each other based on IP address where a source IP address in one event matches a destination IP address in another, and those events are within a given time window. IP addresses provide one mechanism by which endpoint events can be matched with related network events.

As another example, open sockets on an endpoint are a valuable piece of information in this context, as they are visible to the endpoint agent on the endpoint and associate specific processes running on that endpoint with specific network connections ("conversations"). That is, a socket associated with a process running on an endpoint (generally the process that opened the socket) can be associated with a specific five-tuple at a particular moment in time. This in turn can be matched to network activity within that conversation, for example by matching the five-tuple to the header data of packets tapped from the network. This in turn allows that network activity to be matched to a specific socket and the process associated with it. The endpoint itself can be identified by host name, and the combination of host name, five tuple and time is unique (and in many cases the five tuple and time will be unique depending on the network configuration and where the communication is going). This may also make use of the timestamps in the network and endpoint events, as the association between sockets and network connections is time limited, and terminates when a socket is closed.

As noted already, in networking, a five-tuple is a tuple of (source IP, destination IP, source port, destination port, transport protocol). This uniquely identifies a network connection within relatively small time windows. In order to match events based on network connection, a hash of the five tuple can be computed from all network data and from endpoint process connection data (data relating to the network conversations individual processes on the endpoint are engaged in). By ensuring that all endpoint data also contains the host name (derived from the endpoint software), this allows any network event to be correlated with any endpoint event (network 5 tuple hash→endpoint 5 tuple hash→host name) and vice versa. This provides an efficient mechanism for linking specific network connections to specific programs (processes). Such techniques can also be used to link network activity to other event description data, e.g. a specific user account on an endpoint.

Note that a detection may be significant enough to result in an observation, but the observation may or may not be significant enough to escalate it to an analyst at that point. Similarly, the analyst will not generally be alerted to every new case. Rather, cases and/or observations may only be reported to an analyst to alert them to a potential threat when their threat scores reach a significance threshold, or meet some other significance condition. Thus, a large number of observations and/or cases may be created in the background to which an analyst is not alerted, because they are not deemed significant enough. As an example, a first observation may be generated which is not deemed significant enough to report. However, when a second observation is subsequently generated, the analysis may indicate a relationship to the first observation, causing those observations to be grouped in a case. In combination, those observations may or may not be significant enough for the case (group of observations) to be reported at that point (e.g. the case may never be reported, or it may only be reported when a further observation(s) has been subsequently added to it).

As noted, each case/observation is assigned at least one threat score, which denotes its significance When the threat score for a case reaches a significance threshold or the case/observation meets some other significance condition, this causes the case to be rendered accessible via a case user interface (UI) 126.

Access to the cases via the case UI 126 is controlled based on the threat scores in the case records in the experience database 124. A user interface controller (not shown) has access to the cases in the experience database 124 and their threat scores, and is configured to render a case accessible via the case UI 126 in response to its threat score reaching an applicable significance threshold.

Such cases can be accessed via the case UI 126 by a human cyber defense analyst. In this example, cases are retrieved from the experience database 124 by submitting query requests via a case API (application programming interface) 128. The case (UI) 126 can for example be a web interface that is accessed remotely via an analyst device 130.

Thus within the analysis engine there are effectively two levels of escalation.

Case and observation creation, driven by individual events or groups of events that are identified as potentially threat-related.

Escalation of cases to the case UI 126, for use by a human analyst, only when their threat scores become significant, which may only happen when a time sequence of interrelated events has been built up over time As an additional safeguarding measure, the user interface controller may also escalate a series of low-scoring cases related to a particular entity to the case UI 126. This is because a series of low-scoring cases may represent suspicious activity in themselves (e.g. a threat that is evading detection). Accordingly, the platform allows patterns of low-scoring cases that are related by some common entity (e.g. user) to be detected, and escalated to the case UI 126. That is, information about a set of multiple cases is rendered available via the case US 126, in response to those cases meeting a collective significance condition (indicating that set of cases as a whole is significant).

The event-driven nature of the analysis inherently accommodates different types of threats that develop on different time scales, which can be anything from seconds to months. The ability to handle threats developing on different timescales is further enhanced by the combination of real-time and non-real time processing within the system. The real-time enrichment, joining and providing of queued events from the message queue 106 allows fast-developing threats to be detected sufficiently quickly, whilst the long-term storage of events in the telemetry database 116, together with batch enrichment, provide a basis for non-real time analysis to support this.

The above mechanisms can be used both to match incoming events from the message queue 106 and events stored in the telemetry database 116 (e.g. earlier events, whose relevance only becomes apparent after later event(s) have been received) to cases. Appropriate timers may be used to determine when to look for related events in the telemetry database 116 based on the type of event. Depending on the attacker techniques to which a particular event potentially relates, there will be a limited set of possible related events in the telemetry database 116. These related events may only occur within a particular time window after the original event (threat time window). The platform can use timers based on the original event type to determine when to look for related events. The length of the timer can be determined based on the threat hypothesis associated with the case.

Analysis Framework:

The analysis engine is shown to comprise a machine reasoning framework 120 and a human reasoning framework 122. The machine reasoning framework 120 applies computer-implemented data analysis algorithms to the events in the telemetry database 116, such as ML techniques.

Individual events may be related to other events in various ways but only a subset of these relationships will be meaningful for the purpose of detecting threats. The analysis engine 118 uses structured knowledge about attacker techniques to infer the relationships it should attempt to find for particular event types.

This can involve matching a received event or sets of events to known tactics that are associated with known types of attack (attack techniques). As noted, within the analysis engine 118, a plurality of detection modules are provided, each of which queries the events (and possibly other data) to detect suspicious activity. For example, a detection module might be associated with a tactic and technique that describes respective activity it can find. A hypothesis defines a case creation condition as a "triggering event", which in turn is defined as a specific analytic result or set of analytic results that triggers the creation of an observation. A hypothesis also defines a set of possible subsequent or prior tactics or techniques that may occur proximate in time to the triggering events (and related to the same, or some of the same, infrastructure) and be relevant to proving the hypothesis. Because each hypothesis is expressed as tactics or techniques, there may be many different detection modules that can contribute observations to a case. Tactics are high level attacker objectives like "Credential Access", whereas techniques are specific technical methods to achieve a tactic. In practice it is likely that many techniques will be associated with each tactic.

For example, it might be that after observing a browser crashing and identifying it as a possible symptom of a "Drive-by Compromise" technique (and creating a case in response), another observation proximate in time indicating the download of an executable file may be recognized as additional evidence symptomatic of "Drive-by Compromise" (and used to build up the case). Drive-by Compromise is one of a number of techniques associated with an initial access tactic.

As another example, an endpoint event may indicate that an external storage device (e.g. USB drive) has been connected to an endpoint and this may be matched to a potential "Hardware Additions" technique associated with the initial access tactic. The analysis engine 118 then monitors for related activity such as network activity that might confirm whether or not this is actually an attack targeting the relevant infrastructure.

This is performed as part of the analysis of events that is performed to create new cases and match events to existing cases. As indicated, this can be formulated around the "MITRE ATT&CK framework". The MITRE ATT&CK framework is a set of public documentation and models for cyber adversary behavior. It is designed as a tool for cyber security experts. In the present context, the MITRE framework can be used as a basis for creating and managing cases. In the context of managing existing cases, the MITRE framework can be used to identify patterns of suspect (potentially threat-related behavior), which in turn can be used as a basis for matching events received at the analysis engine 118 to existing cases. In the context of case creation, it can be used as a basis for identifying suspect events, which in turn drives case creation. This analysis is also used as a basis for assigning threat scores to cases and updating the assigned threat scores as the cases are populated with additional data. However it will be appreciated that these principles can be extended to the use of any structured source of knowledge about attacker techniques. The above examples are based on tactics and associated techniques defined by the Mitre framework. The described techniques are not limited to Mitre, and can be applied with other forms of tactics/techniques, e.g. in alternative (including bespoke) threat models, or tactics/techniques that are learned via supervised or unsupervised machine learning processing (or other pattern recognition or statistical analysis methods). 'Learned' tactics or techniques characterize potential attacks in machine-understandable terms, which may or may not be interpretable to a human. Tactics/techniques may for example be learned by training one or more models on existing or synthetic attack data, and/or from data learned in recording human analyst behavior.

Case Content:

Each case record is populated with data of the observations identified as relevant to the case. A case provides a timeline of observations that have occurred and a description of why it is meaningful, i.e. a description of a potential threat indicated by those events.

In addition to the event timeline, a case record contains attributes that are determined based on its constituent events. Four key attributes are:

people (users)
processes
devices
network connections

A case record covering a timeline of multiple observations may relate to multiple people, multiple devices and multiple users. Attribute fields of the case record are populated with these attributed based on its constituent events.

A database case schema dictates how cases are created and updated, how they are related to each other, and how they are presented at the case UI 126.

Figure 5:
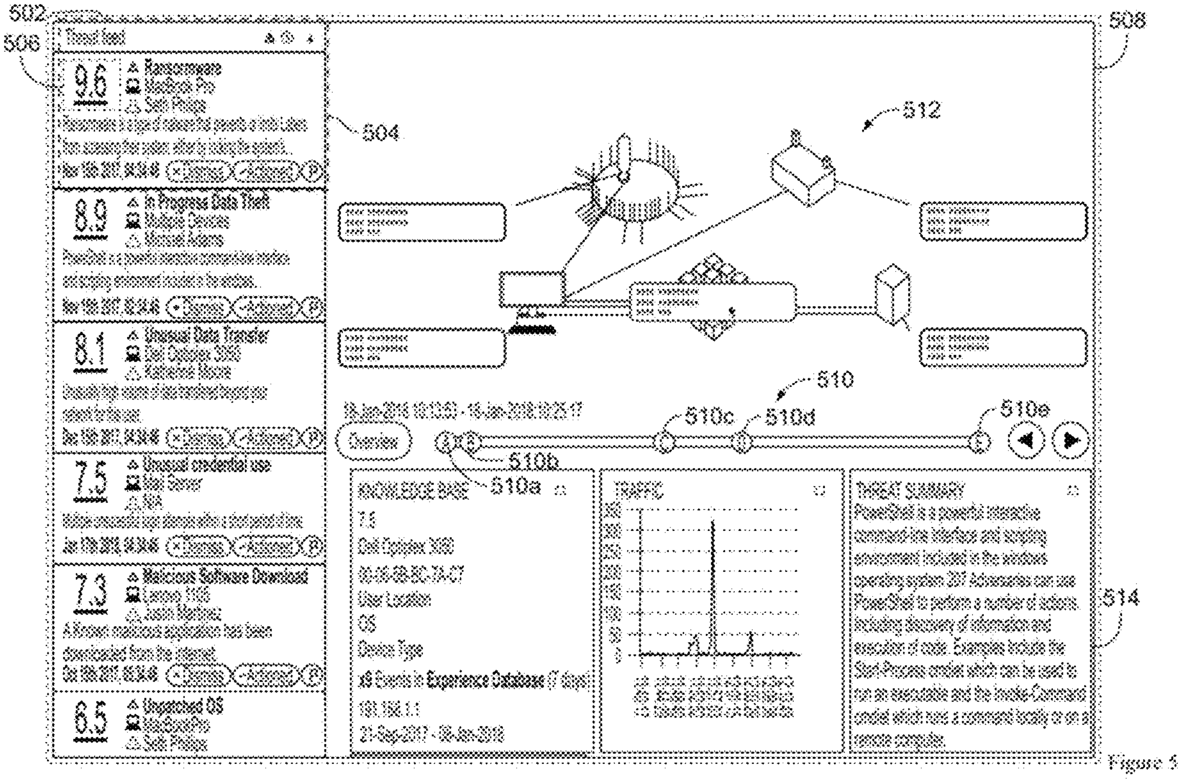
FIG. 5 shows an example layout of a case user interface.
Figure 5A:
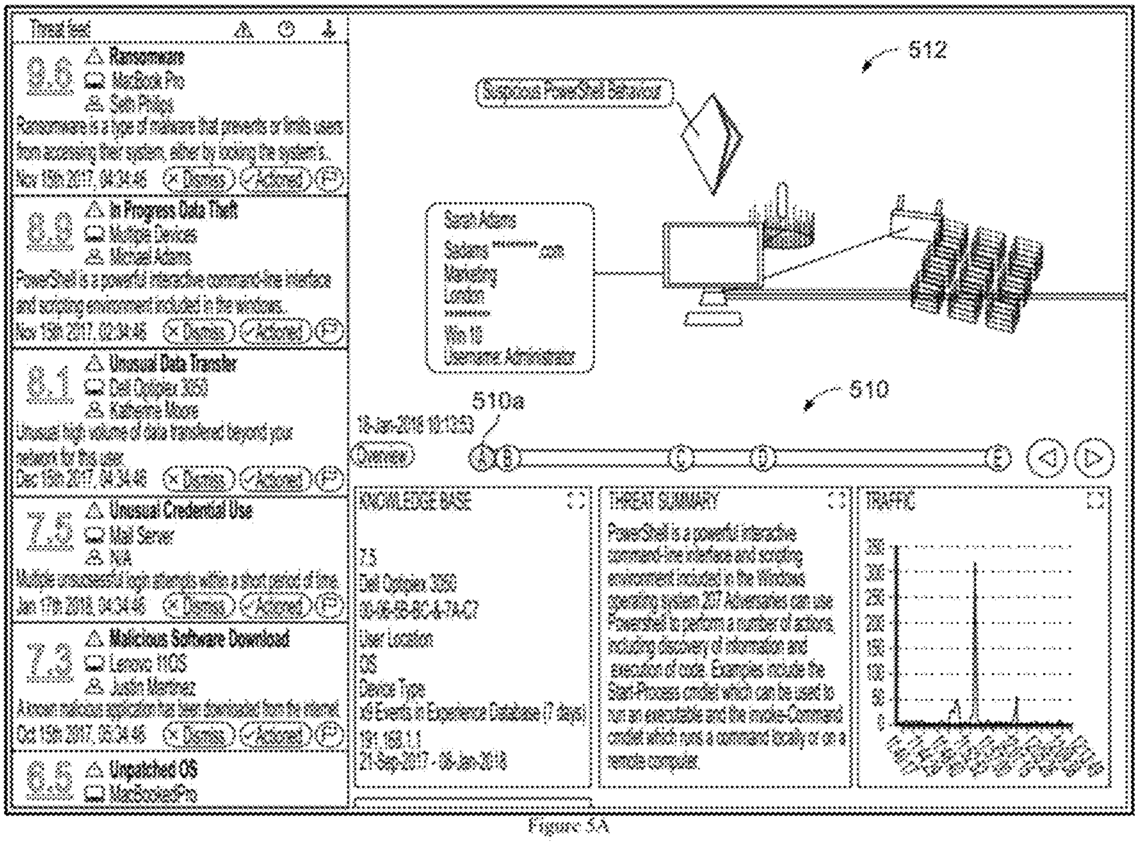
FIGS. 5*a* to 5*e* shows a case user interface dynamically responding to a series of user inputs.
Figure 5B:
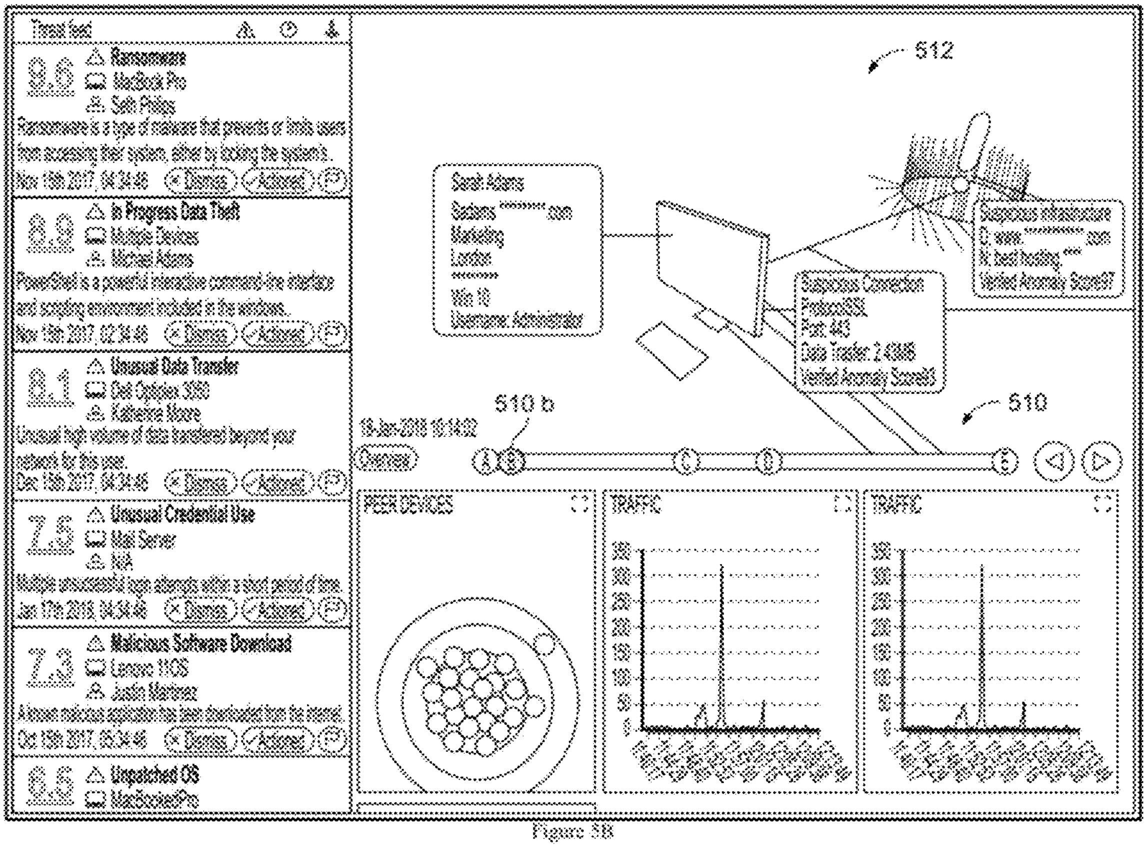
Figure 5C:
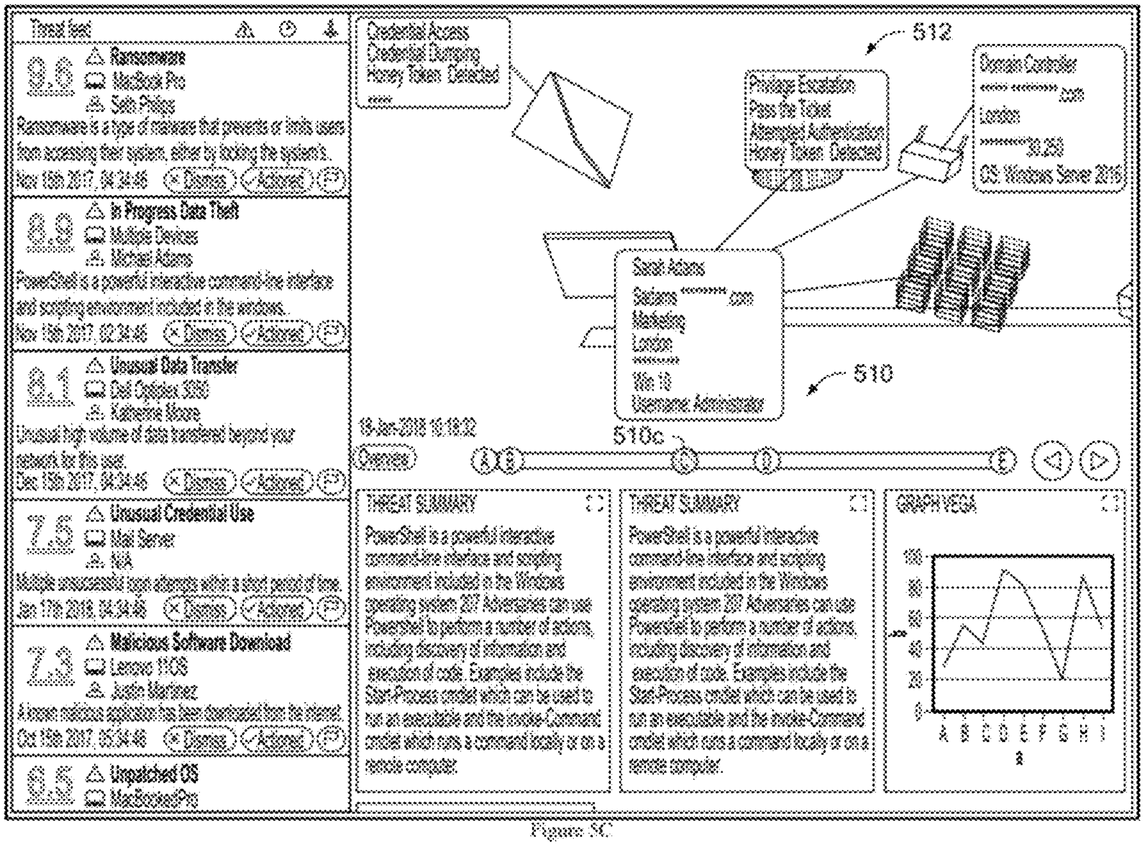
Figure 5D:
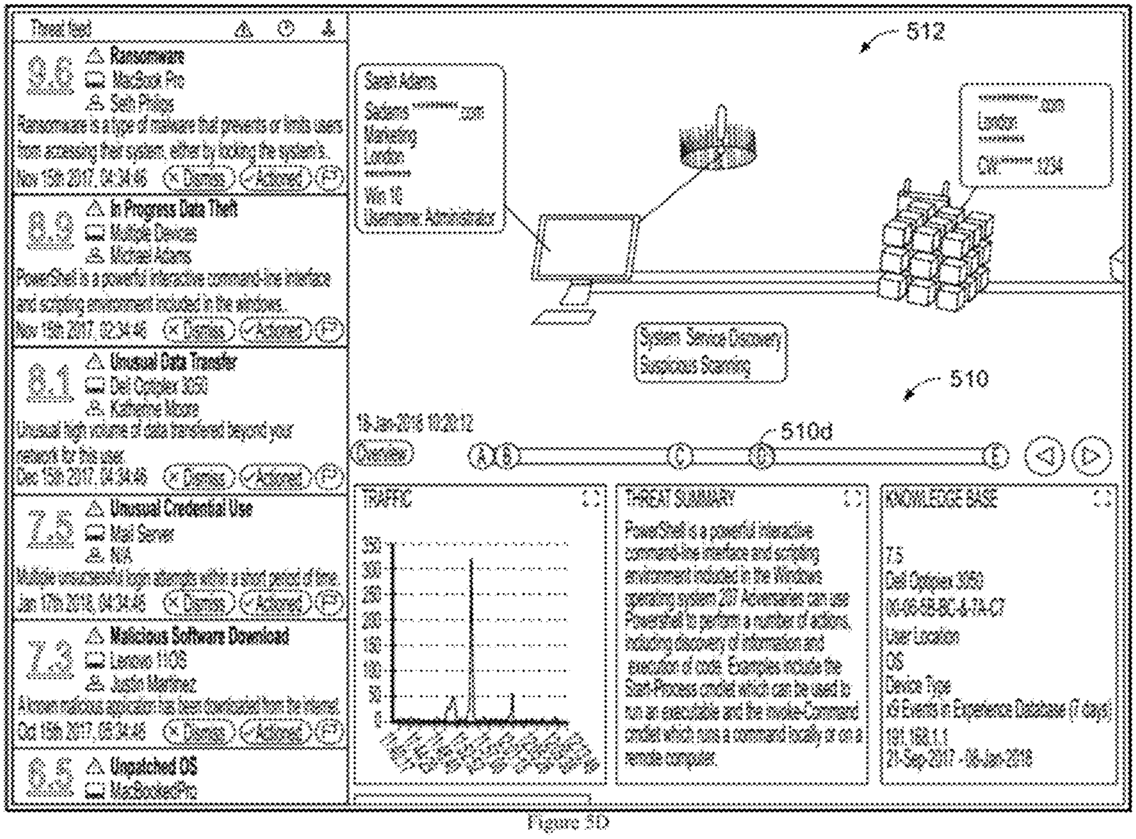
Figure 5E:
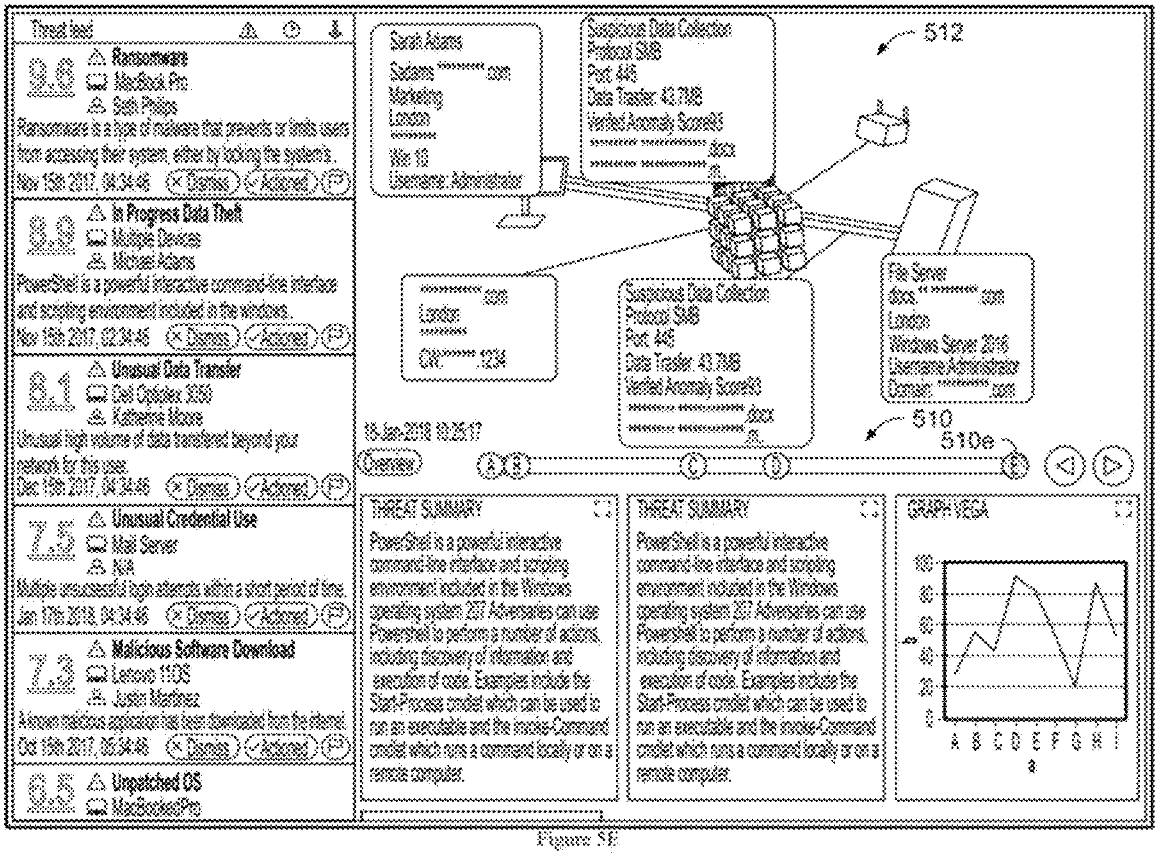

Case User Interface:

FIG. 5 shows an example of a page rendered by the case UI 126 at the analyst device 130. A list of cases 502 is shown, each of which is selectable to view further details of the case in question. Cases are only displayed in the case list 502 if their respective threats scores have reached the required thresholds. The cases in the case list 502 are shown ordered according to threat score. By way of example, the first case 504 in the case list 502 has a threat score of 9.6 (labelled as element 506). Further details of the currently selected case are shown in a region 508 adjacent to the case list 502. In particular, a timeline 510 of the events on which the case is based is shown. That is, the events with which the case is populated in the experience database 124. In addition, a graphical illustration 512 of network components to which those events relate is shown in association with the timeline 510. This can, for example, include endpoints, infrastructure components, software components and also external components which components of the network are in communication with. Additional information that is relevant to the case is also shown, including a threat summary 514 that provides a natural language summary of the threat to which the case relates. This additional information is provided in the form of "widgets" (separable threat information elements), of which the threat summary 514 is one. A visual (or other alert) may be generated when the threat score reaches a certain threshold. For example, a visual alert may be generated by adding a visual indicator of a case to the case list 502.

As shown in FIGS. 5A through 5E, the timeline 510 comprises selectable elements corresponding to the underlying events, which are labelled 510*a* to 510*e* respectively. This can be seen, selecting these timeline elements causes the accompanying graphical representation 512 to be updated to focus on the corresponding network components. The widgets below the timeline are also updated to show the information that is most relevant to the currently selected timeline element.

Enrichment Micro Services:

Returning to FIG. 1, micro services 138 are provided, from which enrichment data can be obtained, both by the batch enrichment framework 134 (second stage enrichment) and the enrichment component 110 (first stage enrichment). These can for example be cloud services which can be queried based on the events to obtain relevant enrichment data. The enrichment data can be obtained by submitting queries to the micro services based on the content of the events. For example, enrichment data could be obtained by querying based on IP address (e.g. to obtain data about IP addresses known to be malicious), file name (e.g. to obtain data about malicious file names) etc.

Hunting Ground:

In addition to the case UI 126, a "hunting" UI 140 is provided via which the analyst can access recent events from the message queue 106. These can be events which have not yet made it to the telemetry database 116, but which have been subject to first stage enrichment and correlation at the event enhancement system 108. Copies of the events from the message queue 106 are stored in a hunting ground 142, which may be a distributed database and which can be queried via the hunting UI 140. This can for example be used by an analyst who has been alerted to a potential threat through the creation of a case that is made available via the case UI 126, in order to look for additional events that might be relevant to the potential threat.

In addition, copies of the raw network data itself, as obtained through tapping etc., are also selectively stored in a packet store 150. This is subject to filtering by a packet filter 152, according to suitable packet filtering criteria, where it can be accessed via the analyst device 130. An index 150*a* is provided to allow a lookup of packet data 150*b*, according to IP address and timestamps. This allows the analyst to trace back from events in the hunting ground to raw packets that relate to those events, for example.

Figure 6:
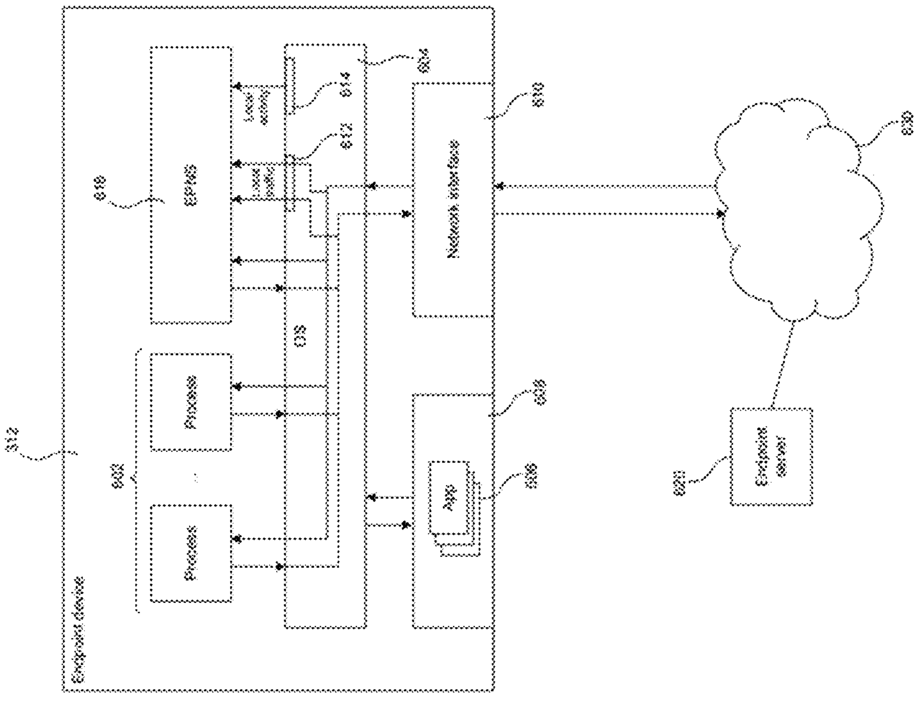
FIG. 6 shows a block diagram of an endpoint device running an endpoint agent.

Enhanced Endpoint Sensor:

FIG. 6 shows a schematic block diagram of an endpoint device 312 on which an enhanced form of endpoint agent is executed. The enhanced endpoint agent is denoted by reference numeral 616 and may also be referred to herein as an endpoint network sensor (EPNS).

Whilst the endpoint agent 316 of FIG. 1 is deployed for the purpose of endpoint activity monitoring, the EPNS 616 is additionally responsible for monitoring local network traffic. That is, in addition to collecting endpoint data, the EPNS 616 additionally monitors local network traffic to and from the endpoint device 312 in order to collect network data locally at the endpoint device 312. Local network traffic monitoring by the EPNS 616 reduces the reliance on network TAPs and other centralized network monitoring components. The description below may refer to the EPNS 616 as the endpoint agent 616 or the network sensor 616 for conciseness.

A set of processes 602 is shown to be executed on the endpoint device 312 and the EPNS collects at least some of the endpoint data by monitoring local activity by the processes 602.

One option is for the EPNS 616 to collect and send copies of all incoming/outgoing network packets for server-side processing, in the manner of a TAP or mirror (but sending a full copy of only its 'raw' local network traffic). In this case, the local network traffic copy would be sent to the coal face producers 102 and/or standardizers 104 of FIG. 1 for preprocessing into structured events in the same way as raw network traffic received from dedicated monitoring components). However, to reduce transmission overhead, some or all of the functions of the coals face producers 102/standardizers 104 may be performed locally by the EPNS 616 instead. In such cases, the EPNS 616 instead transmits a more concise summary of its local traffic, in the form of structured network traffic metadata. The term 'network data' is used broadly, unless otherwise indicated, and does not necessarily imply 'raw' network data (in the context of EPNS reporting, network data can take the form of more-concise network metadata summarizing local network traffic).

In the following examples, the network data collected by the EPNS 616 takes the form of network traffic metadata summarizing its local network traffic. The EPNS 616 processes the incoming and outgoing local traffic in order to extract such metadata therefrom. The extracted metadata summarizes incoming and outgoing packets of the local traffic. The incoming and outgoing packets carry process data intended for and generated by the processes 602 respectively. The EPNS 616 transmits the extracted metadata to an endpoint server 620 for further processing. The endpoint server 620 forms part of the cybersecurity platform that provides a cybersecurity service implemented remotely from the endpoint device 312.

A key piece of network information is a connection or other "flow" identifier. As noted, a connection is defined by a tuple of (source IP address, source port, destination IP address, destination port, transport protocol). A "flow" generalizes the concept of a connection to connectionless protocols (see below). The opening of a connection or establishment of a flow is a key piece of information that can be used for threat detection and analytics. In the described examples, at a minimum, the EPNS 616 reports every flow that is established at the endpoint device 312 (see below for further details), preferably in combination with additional network associated with the flow. Examples of additional types of network metadata are described below.

Figure 7:
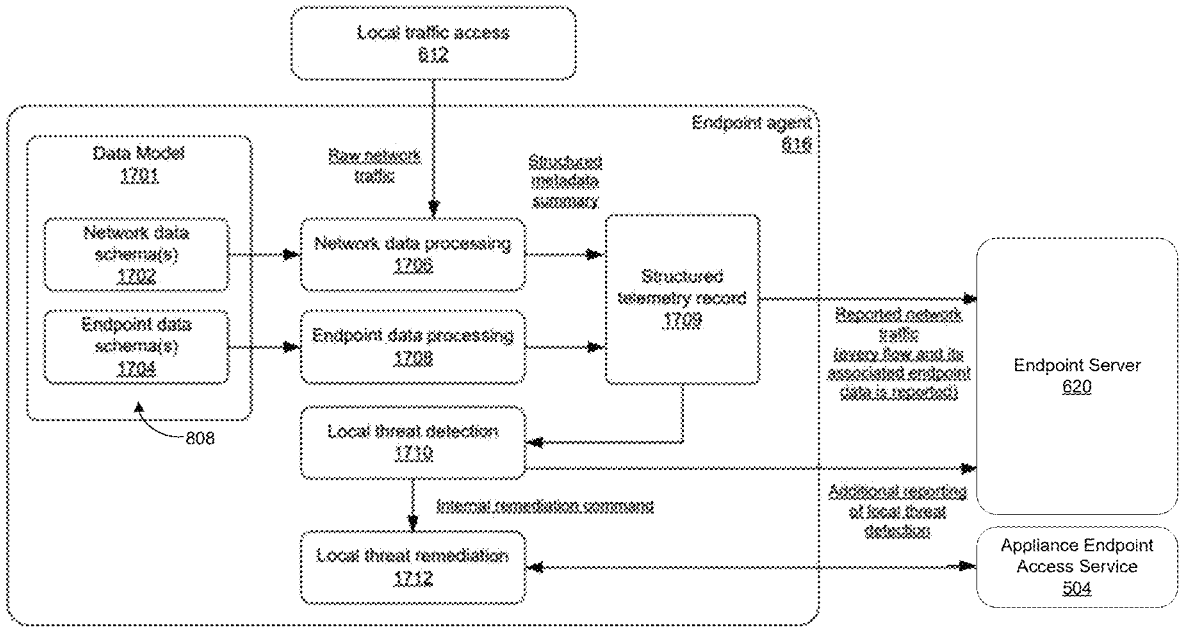
FIG. 7 shows a high-level functional block diagram of an advanced endpoint agent.

FIG. 7 shows a high-level functional block diagram of the endpoint agent 616 in one example implementation. The endpoint agent 616 is shown to comprise a network data processing component 1706, an endpoint data processing component 1708, a local threat detection component 1710, and a local threat remediation component 1712. The network data processing component 1706 receives a copy of the endpoint's raw network traffic, and processes the raw network traffic to detect the start of new network flows and to extract structured network metadata pertaining to new or existing network flows. Respective endpoint data is associated with each flow locally by the EPNS 616, in order to provide one or more structured telemetry records 1709 containing both structured network metadata and associated structured endpoint metadata pertaining to an identified flow. Every new flow that is identified by the EPNS 616 is reported to the endpoint server 620, along with a structured metadata summary of the network data carried in that flow and the associated endpoint data local to the EPNS 616 that has been linked to that flow locally by the EPNS 616.

In order to summarize the "raw" network data in an efficient way that is optimized for subsequent threat analysis, the telemetry data model 1701 may be rendered accessible to the EPNS 616. This allows the EPNS to generate structured events before they are submitted for back-end processing.

A version of the data model 1701 may be stored locally at the endpoint device 312 accessible to the EPNS 616, or accessed by the EPNS 616 from a remote storage location. The data model 1701 comprises one or more network schemas 1702, which are formal data schemas applied to the raw network traffic and used to structure the network metadata in a queryable fashion. For example, different network schemes may be provided for different protocols (such as HTTP, TLS, SSH), meaning that the nature and extent of the network metadata that is generated may be different for different protocols. This may involve some form of "deep" packet analysis. The depth of the analysis may depend on factors such as the network protocol or protocols with which a given packet(s) is associated. Certain packets or parts may be disregarded if they are of no or limited analytical value. For example, encrypted packet contents may be disregarded.

For example, for packets carrying HTTP data, structured metadata elements that are extracted from the packets could include one or more of: an HTTP request method contained in a request, a response code returned by an HTTP server, a size (e.g. number of bytes) in the body of an HTTP request or response, the value of a user agent header, and HTTP authentication method used etc. HTTP is non-encrypted; hence these elements can be extracted from the plaintext application data contained in the packets. This involved full analysis of application-level data contained in the packets. For packets carried via TLS, the structured network metadata could include one or more of: TCP sequence number, a TLS server hostname, one or more TLS fingerprints, a TLS version etc.

For SSH, the extracted metadata elements could include one or more of a client SSH protocol version, a server SSH protocol version, an SSH client name, an SSH server name, comment text from an SSH client or server etc.

Other examples of extracted metadata elements include VLAN or MPLS label(s).

The selective extraction and structuring of network data performed by the EPNS 616 mirrors, at least to some extent, functions of the coal face producers 102 and standardization components 104 shown in FIG. 1. Therefore, the EPNS 616 can remove the need for the coal face producers 102 and/or standardization component 104, or reduce the extent to which those components 102, 104 are relied upon (as structured network events, in the form of network traffic records, are generated locally at the endpoint device 312).

The process of extracting metadata from the local traffic at the endpoint device 312 itself has several benefits. One aim of the local processing is to reduce the amount of network data that needs to be communicated to the endpoint server 620. The metadata does not duplicate the full contents of the incoming and outgoing packets at the endpoint device 312 but provides a sufficiently comprehensive summary to nonetheless be useful in a cybersecurity threat analysis. The use of such metadata in cybersecurity is known per se however existing systems require dedicated components such as network TAPs and appliances that are generally only suitable for deployment in certain networks. Their usefulness is therefore limited to monitoring only network traffic passing through such a network to/from endpoints connected to it directly or remotely using some tunnelling mechanisms such as a VPN connection. In the modern world, with an increasing emphasis on flexible remote access, the limitations of such existing systems are becoming increasingly significant.

Another significant benefit of implementing the EPNS 616 on the endpoint 312 itself is the ability to associate mutually related network events and endpoint events locally at the endpoint 312 itself. Whilst the platform of FIG. 1 that it described above is equipped to perform such linking server-side, such server-side linking is potentially less efficient and more error prone. For example, in the case that endpoint events are collected by endpoint agents and forwarded to the system whilst network traffic is monitored using tapping, the system will receive network and endpoint events from different sources. A large number such events may be received in the infrastructure required to perform the necessary server-side processing is significant. There is also more scope for a percentage of events being lost or delayed.

Significant resources are also required to match large numbers of endpoint events and network events server-side.

The EPNS 616 has the benefit of being able to link local network traffic to endpoint activity based on local timing. The local timing of local network packets received at or sent from the endpoint 312 and the local timing of incident of endpoint activity can typically be determined highly accurately at the endpoint device 312 itself.

However, this is platform dependent. In some cases, the association is done by the operating system itself, and the endpoint agent simply needs to locate that information; in others it comes down to factors such as timing and connection tuple.

The EPNS 616 provides the extracted network traffic metadata to the endpoint server 620 in a series of records transmitted to it. Records containing such network traffic metadata may be referred to herein as network traffic records. Such records, when generated locally at the endpoint device 312 by the EPNS 616, may also be referred to as endpoint records (as described later, the EPNS 616 can be deployed in a system where network traffic records are collected using a combination of local and remote network monitoring). The endpoint records generated by the EPNS 616 are associated with endpoint data collected by the EPNS 616 based on local activity monitoring at the endpoint device 312. For example, it may be the case that the endpoint records are augmented or enriched with such endpoint data locally at the endpoint device 312 or it may be that the endpoint data is contained in separate records generated locally and linked to the network traffic records by the EPNS 616. In general, any combination of augmentation, enrichment, linking and/or any other mechanism that has the effect of associating network traffic records with related endpoint data may be implemented locally at the endpoint device 312 by the EPNS 616. The associated endpoint data is likewise communicated to the endpoint server 620.

Returning to FIG. 6, the endpoint 312 is shown to execute an operating system (OS) 604, on which the processes 602 and the EPNS 616 run. The processes 602 typically include instances of one or more applications 606 stored in computer storage 608 of the endpoint device 312. One function of the OS 604 is to manage the processes 604 and allocate resources to them. The OS 604 also regulates the flow of network traffic between a network interface 610 of the endpoint device 312 and the processes 602 and the EPNS 616.

In addition, the OS 604 provides a local traffic access function 612 (also shown in FIG. 7) and a local activity monitoring function 614. These may, for example, be provided as part of one or more application programming interfaces (APIs) of the OS 604. The EPNS 616 uses the local traffic access function 612 in order to obtain duplicate copies of all incoming and outgoing network packets received at the network interface 610. This includes network packets sent to and from the processes 602, carrying inbound and outbound process data respectively. The EPNS 616 may also receive duplicate copies of its own incoming and outgoing network packets. The EPNS 616 processes the duplicate packet in order to extract the network traffic metadata.

In addition, the EPNS 616 uses the local activity monitoring function 614 to monitor endpoint activity by the processes 602. Examples of the type of endpoint activity that may be monitored may include, but are not limited to, the opening of ports, the accessing of files etc. Such monitoring is used to determine endpoint data. The monitoring may be ongoing, even if the endpoint data is static. For example, processes may be monitored in order to link some activity by a process to one or more network packets. In that case, the endpoint data may take the form of a process identifier (ID) that is associated with a telemetry record(s) summarizing those packet(s) (and, conceivably other identifier(s) such as a file identifier if such information is available). Endpoint data can also include user information, such as details of a user account associated with an incident of network activity, or host information about the endpoint device 312. In that case, a telemetry record of the network activity may be associated with a user identifier. For example, the endpoint data collected by the EPNS 616 and associated with the network traffic records can comprise any combination of process, host and/or user data, for example. For example, with current operating system APIs, it is generally possible to obtain some or all of the following endpoint data for particular network packets: username, process details, parent process details, process path, process command line string. In the following examples, actions by the processes are monitored, in order to link such identifiers to network packets.

The endpoint device 312 is an endpoint of a packet-based network 630 to which it is connected to the network interface 610, and through which the incoming and outgoing network traffic flows. The packet-based network 630 could be a "closed" network such as an enterprise or corporate network (e.g. the private network 300 of FIG. 3). However, it could alternatively be an "open" network (such as the internet 306). Referring to FIG. 3, the network 630 could be the Internet 306 when the endpoint device 312 is "roaming", or the private network 300 when the endpoint device is "non-roaming".

Even when the endpoint device 312 is not currently connected to the private network 300 (whether directly or via a VPN connection), that does not necessarily mean that it poses no threat to the private network. For example, the endpoint device 312 could still contain sensitive data or, should the endpoint device 312 become infected with some form of malware, that could propagate into the private network 300 when the endpoint device 312 does subsequently connect to it. There are therefore significant benefits to being able to detect cybersecurity threats even when the endpoint device 312 is roaming.

The endpoint device 312 could, for example, take the form of a user device such as a laptop or desktop computer, tablet or smart phone etc. The primary function of a user device is to provide useful functions to a user of the device. Such functions are implemented by the processes 602. The EPNS 616 is deployed on such a user device to provide secondary network and endpoint monitoring functions and submit cybersecurity data (network metadata and associated endpoint data in the present example) to the cybersecurity platform for analysis.

Referring to FIG. 7, the EPNS 616 may also structure endpoint data according to the data model 1701. In this case, the data model 1701 includes one or more endpoint schemas 1704 that are used to structure "raw" endpoint data obtained via the OS. Raw endpoint data can be obtained from various sources/interfaces provided by the OS and, as noted, the nature and extent of endpoint data that is available will depend on the OS. The EPNS 616 extracts individual pieces of endpoint data from the raw endpoint data in a structured, queryable fashion, linking or otherwise associating those pieces of endpoint data with the network metadata elements to which they relate. Sources of raw endpoint data include, for example, OS event logs, alerts, performance data (e.g. CPU/memory usage by the processes 602), exceptions, browser extensions, process or thread queries etc. Because the data model 1701 is applied at the endpoint in this case, telemetry events can be passed from the EPNS 616 straight to the message queue 106 by the endpoint server 620, bypassing the standardizers 104 (see FIG. 1).

Process details and/or other forms of endpoint data may be associated with an entire flow (e.g. TCP connection or UDP session) so that all the packets within the flow are linked to the processes. This is important because analyzing collections of packets within a flow rather than just individual packets allows the system to reconstruct data that is spread across multiple packets. In the described examples, packets are analyzed as part of a flow and process details are associated with the flow on the endpoint 312, by the EPNS 616. The server-side only ever sees the results of analyzing a flow (individual packets are not processed by the server in the present examples, rather the server only receives summary data that has already been associated client-side with a specific flow). Here, 'analyzing' refers to the processing of packets by the EPNS 616 to detect and report all new flows to which the endpoint device 312 is party, as they are established, and to extract and transmit structured network telemetry summarizing the network data carried in flows visible at the endpoint 312, in accordance with the data model 1701, for use in server-side threat detection (analyzing does not, in this context, refer to local threat detection; flows are not, for example, only selectively reported when the EPNS 616 considers them indicative of a threat, not is any form of local threat detection required; if local threat detection is performed, all flows are nevertheless reported independently of such local threat detection, e.g. to facilitate server-side triangulation-based detection of threats that may not be evident from a single-point threat analysis at the client device 312).

Centralized threat detection based on data reported from multiple endpoint sensors (and any other monitoring components) is beneficial, as it allows a greater range of threats to be identified (many threats are not immediately evident when only viewed locally at a single endpoint). For example, when two endpoints separately report a common connection or other "flow" between those endpoints, each endpoint will report a set of endpoint data local to that endpoint. De-duplication processing performed server side resulting in a single flow record associated with two sets of endpoint data from the different endpoints (see below for details). This richer information source might, in turn, allow a threat to be identified that is not immediately evident at either one of the endpoints. More generally, a centralized perspective allows threats to be detected or 'triangulated' from multiple sources.

Nevertheless, the EPNS 616 may be configured to additionally perform some level of localized threat detection (complementing the centralized processing), denoted by the local threat detection component 1710. Local threat detection can be based on the same linked network/endpoint data that is reported to the remote cybersecurity service or a more limited set of data provided to a local threat detection component of the EPNS 616. In response to detecting a local threat, the threat detection component can take various actions, such as generating an alert (e.g. visual alert) at the endpoint device 312, or generating a thread remediation command.

Locally-detected threats may be communicated by the local threat detection component 1710 of EPNS 616 to the remote cybersecurity service (the endpoint server 620 in this case). This is separate from, and in addition to the function of reporting of local network traffic, which more closely mirrors a network tap (in combination with a data extraction system) and is 'agnostic' to the threat level associated with the network traffic in that network traffic is reported independently of any local threat detection (that is, all network traffic is reported 'agnostically' EPNS 616 at the level of detail defined in the data model 1701).

In addition, the EPNS 616 can include a remediation component 1712 that allows threat response/remediation measures to be implemented at the endpoint device 312. For example, threat remediation might comprise the EPNS 616 isolating the endpoint device 312 from the network 630. The remediation component may be configured to perform a threat remediation action at the endpoint device 312 responsive to an external command received from the remote cybersecurity service and/or an internal command from the local threat detection component 1710.

LandingNet

Figure 8:
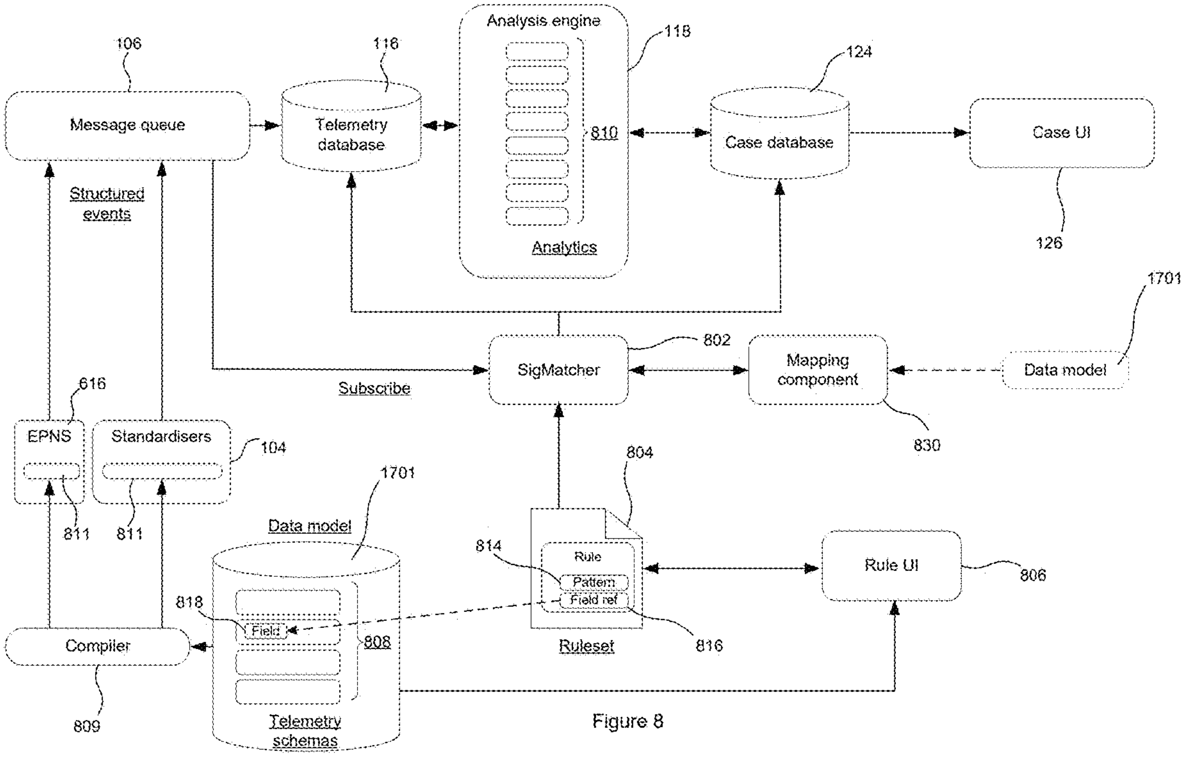
FIG. 8 shows a schematic block diagram of part of a cybersecurity platform incorporating an appliance application that performs configurable signature-based threat detection.

FIG. 8 shows a schematic block diagram of part of the platform incorporating a signature-based detection appliance application 802 (LandingNet). A set of detection modules 810 is shown within the analysis engine 118. LandingNet 802 operates alongside the detection modules 810 to support signature-based and rule-based threat detection.

LandingNet 802 subscribes to the message queue 106, and is thus shown having an input connected to an output of the message queue 106.

As discussed, to facilitate reliable and efficient processing of telemetry collected from different sources, collected telemetry is processed into a highly structured form prior to analysis. Recall that events held in the message queue 106 have been structured according to the telemetry data model 1701. As depicted in FIG. 8, structured events may be generated according to the telemetry data model 1701 by an endpoint agent executed on an endpoint device, such as the EPNS 616, or by the standardization components 104 operating the back-end (or a combination of both).

In the present example, the telemetry data model 1701 is implemented as a set of Protocol Buffers (Protobuf) data schemas 808 that contain 'templates' for different types of events ('messages' in Protobuf parlance). Each event template defines a set of data fields in the form of key-value pairs, with the keys taking the form of simple incrementing integers that are mapped to semantic field identifiers inside the Protobuf schemas.

A schema complier 809 (e.g. Protobuf compiler) compiles each telemetry schema (e.g. Protobuf schema) into executable code 811 (e.g. C++ code), where the template for each event type is embodied as an object class (telemetry class) with a function (or functions) for populating its constituent data field(s). An event is realized as an instance of the applicable event class. Once deployed, a telemetry event of a given type may be generated in accordance with the telemetry schema by instantiating the corresponding telemetry class and invoking the applicable function(s) to populate the data field(s) of the resulting object (the telemetry event). The compiled code 811 is, in turn, incorporated into whichever components of the platform are responsible for generating standardized events (e.g. the EPNS 616 and the standardizers 104).

Protobuf facilities 'serialization' of telemetry events with reasonable storage and transmission efficiency (serialization refers to the process of transferring a data structure out of memory, e.g. for storage or transmission, in a form that allows it to be reconstructed in memory subsequently, possibly in a different device or system). Whilst Protobuf has certain benefits in this context, it will be appreciated that other forms of data schema may be used. References to Protobuf herein apply equally to other forms of data schema technology.

LandingNet's signature/rule-based detection is highly configurable. To this end, a ruleset 804 is stored in a location accessible to LandingNet 802 (e.g. in the form of a file or a collection of files). As noted, the ruleset 804 may be contained or referenced in a configuration file inputted to LandingNet 802. LandingNet 802 applies signature/rule-based detection to structured telemetry events in the message queue 106 based on parameters and settings contained or references in the configuration file, including the ruleset 804.

In the described implementation, LandingNet 802 subscribed to the message queue 106 directly, to allow faster signature-detection. This assumes that the information needed to apply the rules is available in the telemetry records in the message queue 106 prior to enrichment etc. Alternatively or in addition, LandingNet 802 may operate on telemetry records in the telemetry database 116.

In particular, a pattern (or patterns) 814 can be included in the ruleset 804, along with a reference 816 to a data field (or fields) 818 in one or more of the telemetry schemas 808. This, in turn, will cause LandingNet 802 to search for the indicated pattern 814 in events having the referenced data field. Multiple patterns and/or fields can be combined in the configuration file based on logical relationships to allow more sophisticated forms of pattern matching (e.g. involving the detection of a given combination(s) of patterns, possibly across multiple fields). The pattern could be contained in the text of the configuration file itself, or the configuration could include a reference to a pattern or set of patterns stored elsewhere.

In the following description, a rule is defined as one or more patterns and an associated Boolean statement (rule condition). The rule condition specifies which patterns(s) must match in order for the applied rule to generate a specified output. A pattern is a sequence of symbols used to identify content in a specified telemetry field. If a pattern is found to be present in a telemetry field, the pattern is said to match. A pattern may be one of multiple pattern kinds. A pattern kind defines how the pattern is interpreted.

If a rule condition evaluates to 'true' (resulting in an output) the rule is said to 'fire'. The output may be further telemetry in the telemetry database 116 or an observation in the case database 124, and the type of output can be defined in the configuration file 804. A rule may have one or both types of output (or different types or combinations of output associated with different conditions).

A rule can have more than one output, and respective boolean statements may be associated with each output. In this case, the description may refer to a given output 'firing'. For example, a rule may contain a set of patterns (p1 . . . pn), and each output may have a boolean statement defining how a combination of pattern matches should produce a specific output. E.g. output1 may be associated with a boolean statement (p1 and p2 and p3)—meaning patterns p1, p2, and p3 must all be present in their associated fields of a telemetry event for output 1 to be generated—while output2 may be associated with a second boolean statement ((p1 or p2) and p4)—meaning that output 2 will be generated if both p1 and p4 are detected in their associated fields, but also if p4 is detected in (one of) its associated field(s).

When the output type is "telemetry", a rule fire will cause the generation of a further telemetry event (signature detection event) in the telemetry database 116. This will then be queryable by the detection modules 810, who may or may not decide to generate a case in the case database 124 based on the signature detection event. This is suitable for situations in which the signature-based detection is not significant enough to warrant the creation of a case, or where the signature-based detection has a low confidence attached to it, as it allows the detection modules 810 to consider the signature-based detection in the context of other events.

When the output type is "observation", a rule file will result in the creation of an observation in the case database 124.

A rule user interface (UI) 806 is provided, via which the configuration file 804 can be created and edited. Information about the underlying telemetry schemas is also accessible via the rule UI 806. In particular, information about data fields available for pattern recognition is provided. In some cases, pattern recognition can be applied to any data field in the data model 1701. In other implementations, only a subset of data fields with the data model are exposed for this purpose.

Different matching criteria may be defined for a given pattern in the configuration file 804. The following matching criteria are considered:

- exact://string: Entire field must be equal to string.
- startswith://string: Field starts with the exact string string.
- endswith://string: Field ends with the exact string string.
- contains://string: Field contains the exact substring string.
- pcre://regex: Perl-compatible regular expression that matches on regex; technical considerations might motivate using a different regexp standard, e.g. POSIX.
- file://path/to/file.txt: Line-delimited list of patterns (each with type != file;).

Certain principles of the LandingNet schema are illustrated by example below. The following text contains an example of a first rule ('io.senseon.example_sig_1') defined in the configuration file 804:

```
rules:
  - name: 'io. senseon.example_sig_1'
    description: 'Example signature 1'
    enabled: true # bool; enable the entire rule?
    authors: ['author1', 'author2']
    comment: 'Some general comments' # Free text
    copyright: 'SenseOn Tech LTD'
    references :
      - https://example.com/ref1
      - https://example.com/ref2 # Freetext
    patterns:
        p1:
          pattern: 'pcre://^(www\.)?senseon\.io$' # regex support
          comment: 'Comment about this pattern' # Freetext
          field: 'network.dns.query_name'
        p2:
          pattern: 'exact://100.2.3.4'
          nocase: true # false when omitted, not applicable to
regex types
          field: 'network.dns.dns_server_ip'
    outputs:
      - type: telemetry # Only create telemetry record
        enabled: true # bool; this output
        bool: and # and or or to apply to all patterns, ungrouped
        when: '(p1 or p2) or (p1 and p2)' # nesting support
        score: medium
```

Two patterns, p1 and p2, are defined as part of the first rule—as the regular expression "pcre://^(www\.)?senseon\.io$' and string '100.2.3.4'—with different matching criteria (regular expression and exact).

The first pattern p1 is associated with a "query name" field within a DNS telemetry schema of the telemetry data model 1701 (one of the network schemas 1702). The query name field in the DNS schema (topic) of the network package is referenced hierarchically by the string 'network.dns.query_name' [in the hierarchy 'package.topic.field'].

The first pattern p2 is associated with a "DNS server IP" field within the DNS telemetry schema, referenced by the string 'network.dns.dns_server_ip'.

Sections of an example DNS Protobuf telemetry schema relevant to the first rule are shown in the text below:

```
senseon-data-model/src/schemas/senseon/dm/network/dns.proto
syntax = "proto3";
package senseon.dm.network;
/**
 *DNS responses.
 */
message dns
{
...
  /* DNS name queried by the client
   *
   * Example: 'senseon.io'
   */
  string query_name = 31;
...
  /* IP address of the DNS server. This may be the same IP address as in the
   * 'source_ip' or 'dest_ip' field, depending on how it was observed. Always
   * use this field to reliably identify the server IP address.
   *
   * Example: '10.13.0.2', '2001:0db8:0000:0000:0000:ff00:0042:8329'
   */
  string dns_server_ip = 44;
}
```

Here, it can be seen that the query name and DNS server IP fields are defined as fields 31 and 44 of a structured DNS event respectively. An endpoint agent 616 or standardization component 104 would generate a DNS event when a DNS response is observed in network traffic available to it, populating fields 31 and 44 of the DNS event with the relevant details that are then available for signature-based detection.

Note that the schema defines the data type of each field (both fields are 'string' type in this example), and this information is encoded in the Typeless source code, along with the semantic field names.

The first rule is a pattern matching rule based on a regular expression matching on the DNS name queried by a client and an exact matching on the DNS server's IP address. Because the relevant telemetry is highly structured, this rule can be defined in only a few lines within the configuration file.

The "outputs" section of the rule in the configuration file determines the conditions under which the rule fires, and the resulting output(s). The "bool" syntax can be set to "and" or "or". For the former, all patterns must be matched to an event according to their respective matching criteria in order for the rule to fire; for the latter, it is sufficient that only one pattern matched under its matching criterion. More complex Boolean expressions may be indicated using the "when" syntax. Note that "(p1 or p2) or (p1 and p2)" is a 'toy' example to illustrate the syntax for more complex Boolean predicates (the second option is redundant in this case).

The "type" syntax defines the type of output that is generated. Here, the type is set to "telemetry", meaning that, if and when the first rule fires, the result will be a signature detection telemetry event that may be used as a basis for further analysis (which may or may not ultimately lead to the creation of a case).

The "score" syntax denotes a likely threat level associated with the detection (medium in this case).

The following text contains an example of a second rule ('io.senseon.example_sig_2') defined in the configuration file 804:

```
rules:
...
  - name: 'io.senseon.example_sig_2'
    description: 'Example signature 2'
```

-continued

```
    enabled: true
    authors: ['author1', 'author2']
    comment: 'Some general comments'
    copyright: 'SenseOn Tech LTD'
    references:
      - https://example.com/ref1
      - https://example.com/ref2
    patterns:
      p1: # Must be unique
        pattern: 'file://tor_nodes.txt' # Support for 'file' patterns
        field: 'network.*.source_ip' # Support for record-type wildcards
    outputs:
      - type: telemetry # creates telemetry record
        enabled: true # bool; enable this output
        bool: and # and or or to apply to all patterns, ungrouped
        when: 'p1'
         score: medium
         telemetry_comment: 'freetext' # Included in CH output
   - type: observation
        enabled: true # enable this output
        when: 'p1'
        score: medium
        confidence: medium
        severity: medium
        mitre_tactic: 'MITRE/COMMAND_AND_CONTROL'
        mitre_technique: 'MITRE/TECHNIQUE/T1071'
        one_liner: 'Example One-Liner'
        note_a: 'Example Note A'
        note_b: 'Example Note B'
        note_c: 'Example Note C'
```

In the second example, only a single pattern is defined, with a file matching criterion.

The above example illustrates a convenient way of associating a pattern with multiple data fields of the data model. This example uses 'wildcard' syntax—'network.*source_ip'—to concisely reference a field name that appears in multiple schemas within the network package; in this case, a "source IP address" field that would typically be defined in most if not all of the network telemetry schemas 1702 of the data model 1701. A pattern can be associated with multiple fields in other ways, for example by explicitly referencing the multiple fields with which the pattern is to be associated.

The above example considers multiple fields all within the same package (network). However, this can be extended to data fields common to multiple packages. This allows pattern recognition to be easily extended over multiple categories/modalities of telemetry, moving away from a more-conventional 'siloed' approach to telemetry analysis. For example, the same pattern could be applied across network and third-party telemetry, utilizing the highly structured form of the telemetry.

When the second rule fires, it can be seen to result in both a telemetry output and an observation output. The telemetry output is similar in nature to that of the first rule. However, the observation output results in a case being created in the case database 124. The configuration file 804 allows a tactic and a technique to be associated with a given pattern and matching criterion, which is suitable if a particular pattern detection can be confidently linked to a tactic and technique within the threat hypothesis. In this example, the file pattern "tor_nodes.txt" has been associated with technique "T1701" of the Mitre "Command and Control" tactic, with a medium threat score (and medium confidence and severity scores). When the second rule is fired, this causes a case to be created and associated with that tactic and technique.

Note that a rule can have multiple activation conditions, with different outcomes. For example, the following syntax could be used within a rule definition to trigger both a signature detection telemetry output and a case when patterns p1 and p2 are detected in their applicable fields, but only a telemetry output when only one of those patterns is detected in an applicable field:

```
outputs:
  - type: observation
    when: '(p1 and p2)
        ...
  - type: observation
    when: '(p1 and p2)
        ...
  - type: telemetry # Added for a different condition to output only
    telemetry when: '(p1 or p2)'
        ...
```

The examples above consider rules defined on network events. However, rules can be similarly defined in the configuration file 804 on any form of telemetry. For example, part of a "process" data schema within the endpoint optic of the data model might be defined as:

```
senseon-data-model/src/schemas/senseon/dm/endpoint/process.proto
syntax = "proto3";
package senseon.dm.endpoint;
message process
{
...
  int64 id = 2;           // Process (or thread) ID
  int64 parent_id = 3;  // Parent process (or thread) ID
...
  string username = 9; // Name of the user under which the process
...
}
```

The above part of the schema defines a "process" event which might, for example, be created when a new process is executed on the endpoint device. A pattern matching rule can easily be defined in the configuration file by referencing, e.g. the process, parent process or user field and mapping a pattern (or patterns to that field).

Rules can be defined on multiple categories of telemetry. For example, a rule could be defined so as to fire when a first pattern is detected in a network telemetry field (e.g. IP address) and a second pattern is detected in an endpoint telemetry field (e.g. process, parent process or user). In some implementations, this may be restricted to fields within the same record (as implemented for now at least), so that a single rule cannot apply to multiple telemetry records. This ensures that each telemetry record can be processed independently of any other telemetry record (among other things, this simplifies a clustered implementation across multiple processing nodes).

With Protobuf, within the telemetry records themselves, fields are identified only by integer keys. There is no information about field names within the telemetry records. Each telemetry event contains an indicator of the corresponding topic, but fields are only identified by integer keys. However, the underlying Protobuf schemas of the data model 1701 map Protobuf keys to semantic strings, and those integer-string mappings can be incorporated in or made accessible to LandingNet 802 to allow fields to be referenced by string (rather than integer) in the ruleset 804.

In this regard, a mapping component 830 is shown. The mapping component 830 is implemented as an instance of Typeless, which, as noted, is a set of software components that embody the associations between field keys and their semantic field names (string identifiers) in the data model 1701. In operation, upon receiving a structured event, LandingNet 802 extracts the topic from the event and provides the topic to the mapping component 830. The mapping component 830 returns the corresponding string identifier(s) of the underlying data model 1701, which in turn can be compared with the string identifiers in the ruleset 804, allowing the signature-based detection rules to be applied. LandingNet 802 interfaces with the mapping component 830 using the call back mechanism described above with reference to FIG. 11.

The same considerations apply to serialization/data exchange formats other than Protobuf that prioritize conciseness on the wire over interpretability.

Figure 9:
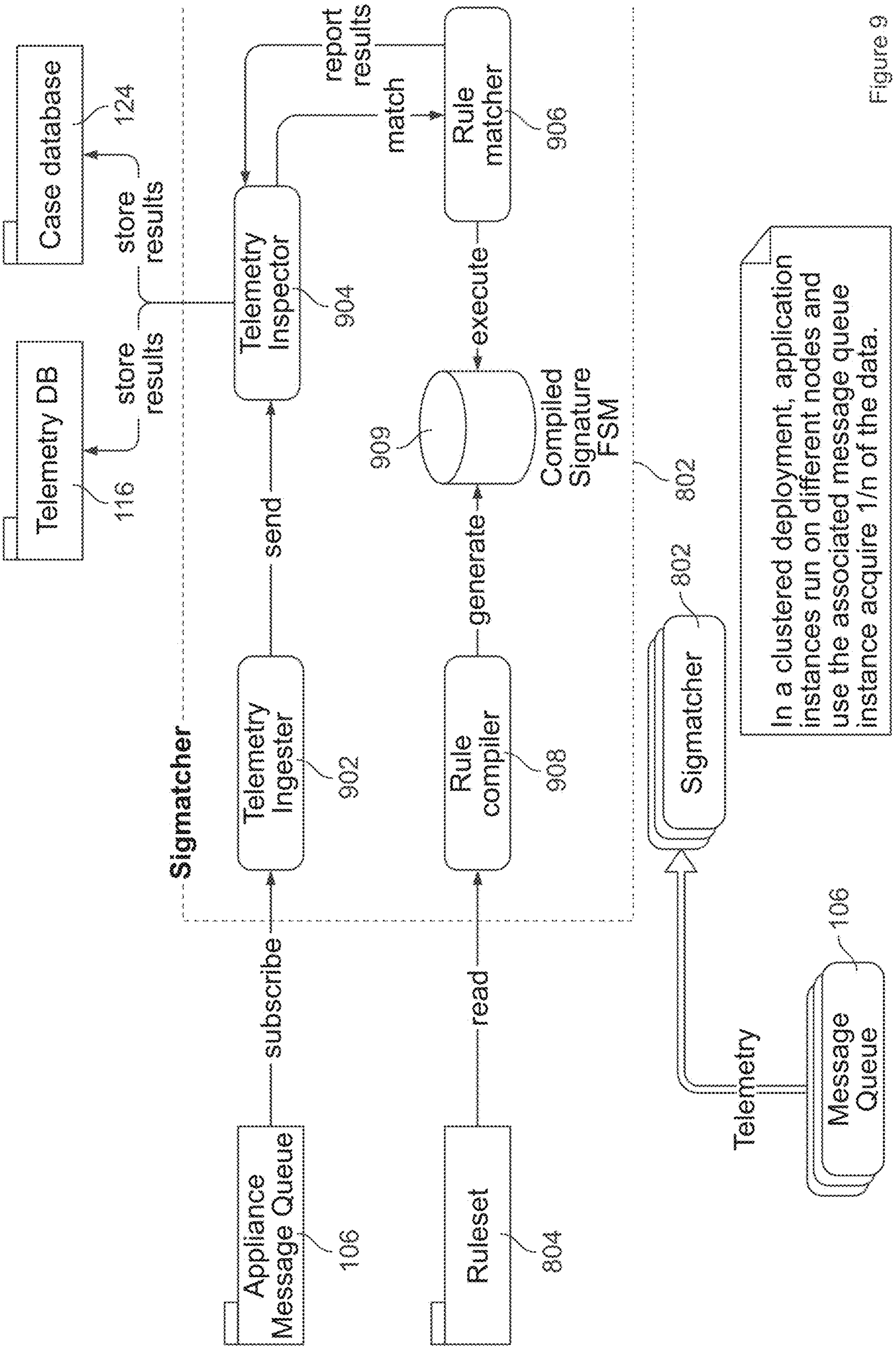
FIG. 9 shows a functional block diagram of a signature-based detection application.

FIG. 9 shows further details of the LandingNet appliance application 802.

LandingNet 902 is shown to comprise a telemetry ingestion component 902 that ingests events from the message queue 106, a telemetry inspection component 904, a rule matcher 906 and a rule compiler 908. The rule compiler 908 converts the human-readable rules contained in the ruleset 804 into optimized, in-memory representations 909 that allow the rules to be evaluated in a performant manner. The in-memory representation 909 is a data structure stored in memory, which minimizes a) duplicate match operations for the same pattern and field; b) the number of representations of each pattern; and c) the number of results produced in a single match operation. This is achieved through the use of multiple matching algorithms and systems (such as hash table-based matching, Aho-Corasick, Intel Hyperscan etc.), combined with the association of detection context with patterns. Once initialized, LandingNet receives telemetry from the message queue (or 1/n telemetry in a clustered configuration of n nodes).

The message queue 106 provides temporary event storage to facilitate service-to-service communication, and LandingNet 802 performs stream processing on telemetry events, without the events having to be committed to long term storage. Depending on the implementation, the telemetry events may or may not be committed to long term storage for processing elsewhere in the platform (for example, in the implementation above, events may be committed to the telemetry database 116 for processing by the detection modules 810, but this is not a requirement of LandingNet 802). By operating directly based on events from the message queue 106, LandingNet 802 can provide more responsive signature-based detection and (where appropriate) alerting. The mapping component 830 facilitates this more responsive architecture; events in the message queue 106 are still in serialized form, and the mapping component 830 allows LandingNet 802 to operate on serialized events, by passing event topics and field keys to the mapping component to resolve the field keys to field names of the data model 1701 (separately, events are deserialized for storage in the telemetry database 116, but in the described implementation, LandingNet 802 does not operate on the telemetry database 116 for the reasons discussed).

LandingNet 802 may be said to be coupled to event storage, which includes the case that the event storage takes the form of a message queue (distributed or non-distributed) to which LandingNet 810 subscribes. The term 'queue' is used broadly to refer to temporary storage, typically used to facilitate service-to-service communication and stream processing. Depending on the implementation, one or multiple services may process events that have not been committed to long term storage. Whilst a single (distributed or non-distributed) message queue 106 is shown, various architectures can be used to facilitate service-to-service communication, including message queue architectures, publish/subscribe architectures etc. (or even long-term storage in alternative implementations).

The rule matcher 906 uses the compiled rules to process telemetry and determine when outputs are due.

In a clustered deployment, the appliance message queue is partitioned into n component queues, with n instances of LandingNet operating in the manner described above but on the n partitions in parallel.

Typeless Interface

The Typeless interface has been described above with reference to FIG. 11, and the above description considers a specific use case of Typeless to implement a signature-based detection application. Other use cases of Typeless are considered below.

Figure 10:
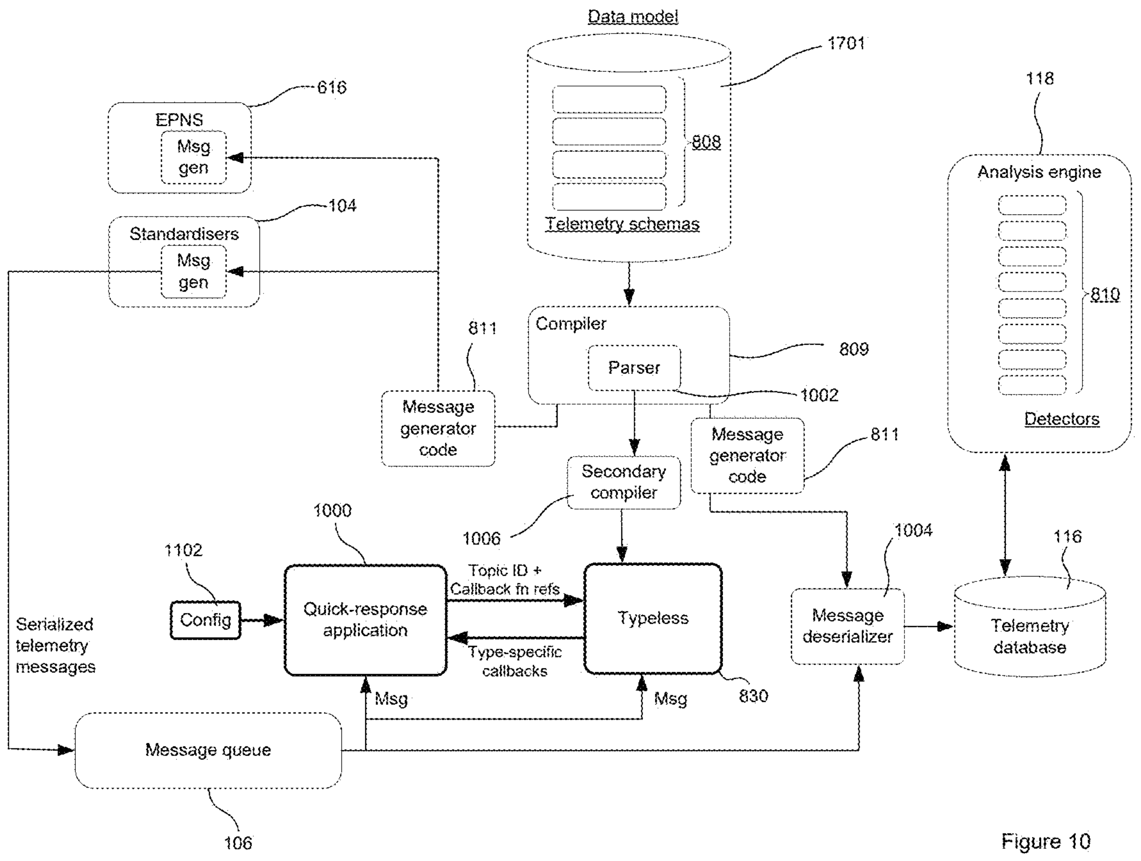
FIG. 10 shows an example deployment of a typeless interface within a cybersecurity system.

FIG. 10 shows further details of the deployment of Typeless within the cybersecurity platform. To the extent FIG. 10 overlaps with FIG. 8, the description is not repeated.

The schema compiler 809 is shown to comprise a parser 1102, which parses the telemetry schemas 808 to enable those schemas 808 to be converted to programmatic representation in schema program code 811, which in turn can be incorporated in various system component such as the sensors 616, 104, and a de-serialization component 1004, whose role is to retrieve telemetry messages from the message queue 106, and convert those messages to structured database records stored in the telemetry database 116.

With Protobuf schemas, the standard Protobuf compiler is sufficient for the purpose of generating the schema program code 811.

A secondary compiler 1006 uses the output of the parser 1102 to compile the code of the Typeless interface 830. In addition to building in the message structures captured from the schemas 808 in the output of the parser, the secondary compiler 1006 builds the Typeless call back interface described above into the Typeless code.

With Protobuf, the secondary compiler 1006 may, for example, be implemented as a bespoke plugin to the main Protobuf compiler.

As discussed, one use case of Typeless is to provide a fast-response application 1000 (such as LandingNet 802) that operates directly on messages held in the message queue 106, alongside the detector 810 that operate on the telemetry records in the telemetry database 118, which may be based on some configuration input 1102 to the application 1000 at runtime.

A broader category of use case is message processing (processing telemetry data received in an existing message).

Figure 12:
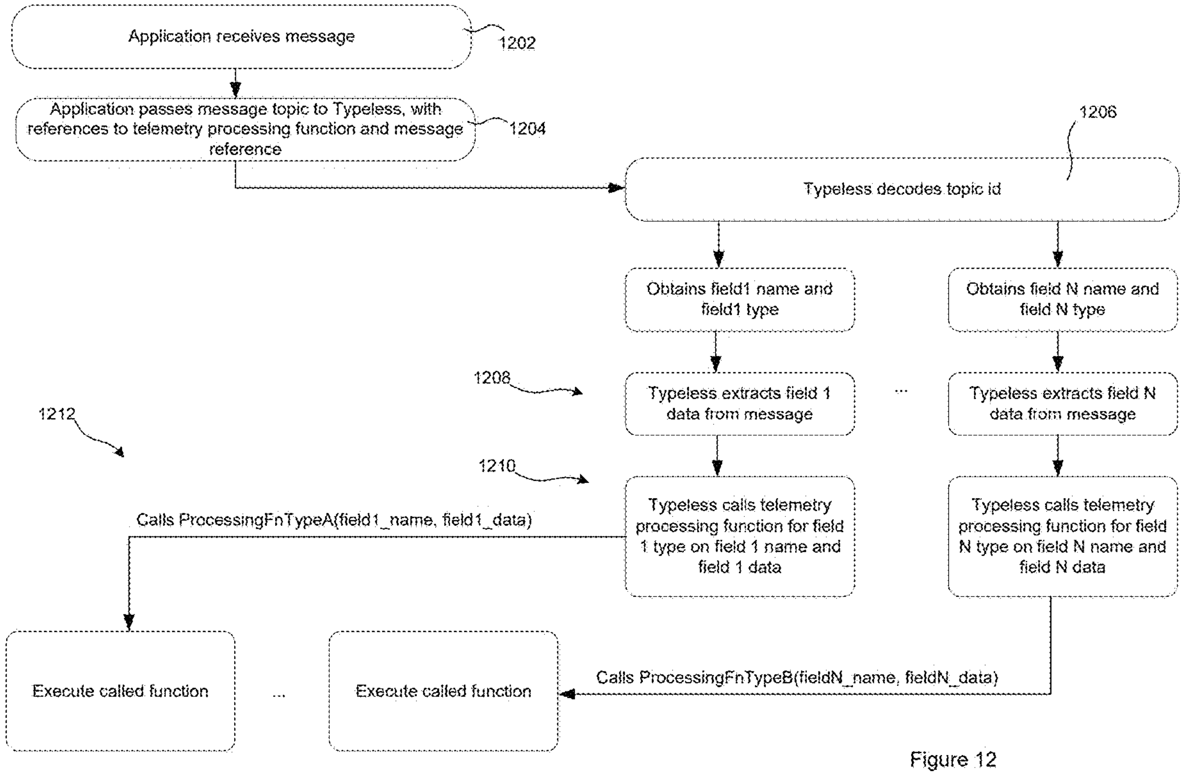
FIG. 12 shows a flowchart for a method of processing a telemetry message using a typeless interface.

FIG. 12 shows a flowchart for a general telemetry processing method implemented by an application supported by Typeless.

At step 1202, the application receives a telemetry message.

At step 1204, the application passes the message (e.g. by providing a reference to the message in memory) to Typeless, along with a topic identifier of the message (alternatively, typeless may extract the topic identifier from the message itself), and a set of type-specific telemetry processing callback functions (which may also be passed as references).

At step 1206, Typeless decodes the topic identifier, thereby obtaining the name and type of each field (Field 1, . . . , Field N).

Typeless then extracts the telemetry data from each data field (1208), and calls the type-appropriate callback function on the telemetry data (1210), causing the application to apply the applicable telemetry processing function(s) to the correct telemetry data. If the message contains multiple data fields of the same type, the same callback function will be called back multiple times on different telemetry data.

The telemetry data contained in a single data field has a single data type, and may be referred to as a telemetry datum. A telemetry datum may be extracted by assigning it as a value to a variable of the correct type.

The callback functions may take other argument(s), such as the field name and/or the field number, in addition to or as an alternative to the field data.

Figure 13:
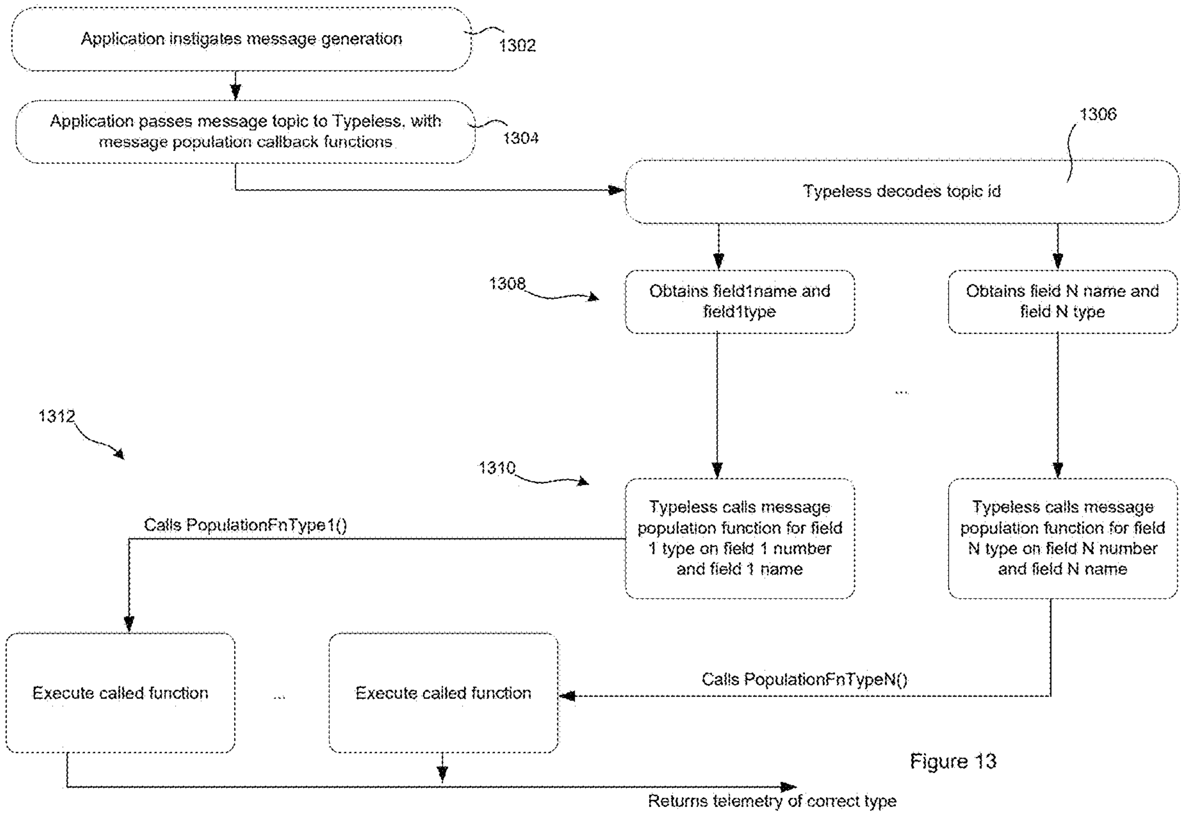
FIG. 13 shows a flowchart for a method for generating a telemetry message using a typeless interface.

FIG. 13 shows a flowchart for a general telemetry message generation method implemented by an application supported by Typeless. In this case, an application causes a telemetry message to be generated. Again, the application is coded without knowledge of the message structures at compile time.

At step 1302, the application instigates message generation, passing (1304) a message topic (indicating a desired message type) to Typeless, together with a set of message population callback functions.

At step 1306, Typeless decodes the topic ID, thereby obtaining the name and type of each field (Field 1, . . . , Field N). This, in turn, causes typeless to call (1310) the type-appropriate message population callback function for each message field, thus causing the application to execute (1302) the message population callback function in respect of that data field.

The message is generated by Typeless, as the knowledge of the message structure is contained in Typeless. To allow Typeless to generate the message, each type-specific message population function returns a piece of telemetry of its specific type (e.g. int, float, string etc.), which typeless then uses to populate the relevant field of the message. In calling one of the type-specific callback functions, Typeless requests from the application a piece of telemetry data of that specific type.

One viable use case is the generation of 'dummy' telemetry, e.g., for testing purposes. In this case, each message population function may simply return a random or predetermined value of the correct type. This may not require the use of field names at all, depending on how it is implemented. This mechanism can be used to generate large volumes of dummy telemetry within minimal user input.

Typeless can also be used as an interface for structuring actual telemetry. In this case, the message population callback function might be called back on the relevant field name. Similar to LandingNet, a runtime configuration input could be used to specify some rule for extracting some named piece of telemetry to be passed back to Typeless. For example, a string-type message population might be called in the following circumstances:

Typeless calls back MsgPopString(network.dns.dns_server_ip)

This function call back causes the application to carry out a rule defined in the configuration input for extracting a DNS server IP address from a set of 'raw' network telemetry, which would then be returned by MsgPopString( ) as a string-type variable (implicit in the choice of callback function). Again, a key point to note is that the application does not require knowledge of the network.dns.dns_server_ip message field, or its data type at application compile time. The field name and type only become known to the application at runtime.

Once a message has been generated, it may be stored by Typeless in the message queue 106, or passed to the application, e.g., for the application to store the message in the message queue 106.

In the above examples, Typeless operates somewhat differently when supporting message read functionality compared with message write functionality. In practice, it may be convenient to provide two Typeless interfaces; one configured for general-purpose read functionality and one for general-purpose write functionality (but still agnostic to the details of the application functionality).

The above examples assume that a full set of message attributes (field number, field name, field type) is encoded in Typeless for every message type. However, not all of those attributes will necessarily be needed for every application. To support type-agnostic applications, the field types need to be encoded in Typeless. The field numbers and/or field names may or may not be required depending on the use case.

It will be appreciated that the examples described above are illustrative rather than exhaustive. In general, the functional components described above can be implemented in one or more computing devices at one or more locations within a localized or distributed computer system. A computer system comprises computing hardware which may be configured to execute any of the steps or functions taught herein. The term computing hardware encompasses any form/combination of hardware configured to execute steps or functions taught herein. Such computing hardware may comprise one or more processors, which may be programmable or non-programmable, or a combination of programmable and non-programmable hardware may be used. Examples of suitable programmable processors include general purpose processors based on an instruction set architecture, such as CPUs, GPUs/accelerator processors etc. Such general-purpose processors typically execute computer readable instructions held in memory coupled to the processor and carry out the relevant steps in accordance with those instructions. Other forms of programmable processors include field programmable gate arrays (FPGAs) having a circuit configuration programmable through circuit description code. Examples of non-programmable processors include application specific integrated circuits (ASICs). Code, instructions etc. may be stored as appropriate on transitory or non-transitory media (examples of the latter including solid state, magnetic and optical storage device(s) and the like).

The invention claimed is:

1. A cybersecurity system comprising:

a data store comprising:

a mapping component corresponding to program code compiled from a telemetry serialization schema; and a cybersecurity application corresponding to program code compiled independently of the mapping component and the telemetry serialization schema, the program code embodying a plurality of telemetry functions, wherein each telemetry function is specific to a different data type, the cybersecurity application configured to provide to the mapping component a message topic for a telemetry message comprising a data field having a data type that is not known to the cybersecurity application;

wherein the mapping component is configured to determine the data type of the data field based on the message topic, and cause the cybersecurity application to apply, to the data field, the telemetry function associated with the data type of the data field; and one or more hardware processors to execute the mapping component and the cybersecurity application.

2. The cybersecurity system of claim 1, wherein the cybersecurity application is configured to indicate the plurality of telemetry functions to the mapping component, and mapping component is configured to cause the cybersecurity application to apply the telemetry function to the data field via a call back to the telemetry function.

3. The cybersecurity system of claim 1, wherein the plurality of telemetry functions are stored as code portions in respective regions of processor memory, and indicated by the application providing respective references for identifying the respective regions of memory.

4. The cybersecurity system of claim 1, 2 or 3, wherein the mapping component is configured to determine based on the message topic a field name of the data field and cause the application to apply the telemetry function to the field name.

5. The cybersecurity system of claim 4, wherein at least a first telemetry function of the plurality of telemetry functions is configured to match the field name of the data field to a field name contained in a configuration input to the cybersecurity application.

6. The cybersecurity system of claim 5, wherein the telemetry message is received by the cybersecurity application in serialized form, and the telemetry function is a telemetry processing function applied to a piece of telemetry data contained in the telemetry message.

7. The cybersecurity system of claim 6, wherein the mapping component is configured to extract a telemetry datum from the data field and cause the application to apply the telemetry processing function to the telemetry datum.

8. The cybersecurity system of claim 7, wherein the telemetry processing function is configured to match the field name of the data field to the field name contained in the configuration input, compare the telemetry datum to a pattern associated with the field name in the configuration input, and trigger a cybersecurity action responsive to a pattern match.

9. The cybersecurity system of claim 1, wherein the telemetry function is a telemetry generation function configured to return to the mapping component a piece of telemetry of its specific data type, and wherein the mapping component is configured to populate the data field with the piece of telemetry.

10. The cybersecurity system of claim 1, the data store further comprising:

a message queue;

an analysis component;

a telemetry database queryable by the analysis component;

a deserialization component configured to receive messages from the message queue and convert each message to a database record in the telemetry database; and wherein the analysis component is configured to perform a cybersecurity analysis on data records contained in the telemetry database;

wherein the cybersecurity application and the mapping component operate directly on the message queue, without accessing the telemetry database.

11. A method of processing cybersecurity telemetry data, the method comprising:

providing to a mapping component, by a cybersecurity application, a message topic for a telemetry message comprising a data field having a data type that is not known to the cybersecurity application, wherein cybersecurity application corresponds to program code compiled independently of the mapping component and a telemetry serialization schema, the program code embodying a plurality of telemetry functions, wherein each telemetry function is specific to a different data type, wherein the mapping component corresponds to program code compiled from a telemetry serialization schema; and determining, by the mapping component, the data type of the data field based on the message topic, and causing the cybersecurity application to apply, to the data field, the telemetry function associated with the data type of the data field.

12. The method of claim 11, comprising:

automatically generating the program code of the mapping component based on the telemetry serialization schema, independently of the cybersecurity application.

13. The method of claim 11, wherein the telemetry message is received by the cybersecurity application in serialized form, and the telemetry function is a telemetry processing function applied to a piece of telemetry data contained in the telemetry message.

14. The method of claim 11, wherein the telemetry function is a telemetry generation function configured to return to the mapping component a piece of telemetry of its specific data type, and wherein the mapping component is configured to populate the data field with the piece of telemetry.

15. One or more non-transitory media embodying computer-readable instruction configured so as, upon execution by one or more computer processors, to cause the one or more hardware computer processors to implement a method comprising:

providing to a mapping component, by a cybersecurity application, a message topic for a telemetry message comprising a data field having a data type that is not known to the cybersecurity application, wherein cybersecurity application corresponds to program code compiled independently of the mapping component and a telemetry serialization schema, the program code embodying a plurality of telemetry functions, wherein each telemetry function is specific to a different data type, wherein the mapping component corresponds to program code compiled from a telemetry serialization schema; and determining, by the mapping component, the data type of the data field based on the message topic, and causing the cybersecurity application to apply, to the data field, the telemetry function associated with the data type of the data field.

16. The one or more non-transitory media of claim 15, wherein the method further comprises:

automatically generating the program code of the mapping component based on the telemetry serialization schema, independently of the cybersecurity application.

17. The one or more non-transitory media of claim 15, wherein the telemetry message is received by the cybersecurity application in serialized form, and the telemetry function is a telemetry processing function applied to a piece of telemetry data contained in the telemetry message.

18. The one or more non-transitory media of claim 15, wherein the telemetry function is a telemetry generation function configured to return to the mapping component a piece of telemetry of its specific data type, and wherein the mapping component is configured to populate the data field with the piece of telemetry.

* * * * *